(12) United States Patent
Jacobson et al.

(10) Patent No.: US 8,139,050 B2
(45) Date of Patent: **\*Mar. 20, 2012**

(54) ADDRESSING SCHEMES FOR ELECTRONIC DISPLAYS

(75) Inventors: Joseph M. Jacobson, Newton Centre, MA (US); Barrett Comiskey, Shanghai (CN); Russell J. Wilcox, Natick, MA (US)

(73) Assignee: E Ink Corporation, Cambridge, MA (US)

( \* ) Notice: Subject to any disclaimer, the term of this patent is extended or adjusted under 35 U.S.C. 154(b) by 2089 days.

This patent is subject to a terminal disclaimer.

(21) Appl. No.: 10/906,019

(22) Filed: Jan. 31, 2005

(65) Prior Publication Data

US 2006/0139308 A1  Jun. 29, 2006

Related U.S. Application Data

(63) Continuation-in-part of application No. 09/683,179, filed on Nov. 29, 2001, now Pat. No. 7,023,420, which is a continuation-in-part of application No. 08/983,404, filed as application No. PCT/US96/12000 on Jul. 19, 1996, now Pat. No. 7,106,296, which is a continuation-in-part of application No. 08/504,896, filed on Jul. 20, 1995, now Pat. No. 6,124,851.

(60) Provisional application No. 60/253,892, filed on Nov. 29, 2000.

(51) Int. Cl.
G09G 5/00 (2006.01)
G09G 3/34 (2006.01)

(52) U.S. Cl. .................................... 345/204; 345/107

(58) Field of Classification Search .................. 345/901, 345/204, 107
See application file for complete search history.

(56) References Cited

U.S. PATENT DOCUMENTS

| | | | |
|---|---|---|---|
| 3,036,388 A | 5/1962 | Tate | |
| 3,460,248 A | 8/1968 | Tate | |
| 3,406,363 A | 10/1968 | Tate | |
| 3,612,758 A | 10/1971 | Evans et al. | |
| 3,617,374 A | 11/1971 | Hodson et al. | |
| 3,668,106 A | 6/1972 | Ota | |

(Continued)

FOREIGN PATENT DOCUMENTS

EP  0 281 204 A2  9/1988

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

Primary Examiner — Alexander Eisen
(74) Attorney, Agent, or Firm — David J. Cole

(57) ABSTRACT

An electronic display comprises an electro-optic material (preferably an electrophoretic medium) having a plurality of pixels, and separate first, second and third sets of addressing means for addressing these pixels. Each of the pixels is associated with one addressing means in each of the three sets, such that addressing of any specific pixel requires application of signals within predetermined ranges to each of the three addressing means associated with the specific pixel being addressed. The display may be in the form of a multi-page electronic book.

19 Claims, 28 Drawing Sheets

U.S. PATENT DOCUMENTS

| | | |
|---|---|---|
| 3,700,802 A | 10/1972 | Markin et al. |
| 3,756,693 A | 9/1973 | Ota |
| 3,767,392 A | 10/1973 | Ota |
| 3,792,308 A | 2/1974 | Ota |
| 3,806,893 A | 4/1974 | Ohnishi et al. |
| 3,850,627 A | 11/1974 | Wells et al. |
| 3,870,517 A | 3/1975 | Ota et al. |
| 3,892,568 A | 7/1975 | Ota |
| 4,041,481 A | 8/1977 | Sato |
| 4,045,327 A | 8/1977 | Noma et al. |
| 4,068,927 A | 1/1978 | White |
| 4,071,430 A | 1/1978 | Liebert |
| 4,088,395 A | 5/1978 | Gigila |
| 4,123,346 A | 10/1978 | Ploix |
| 4,126,854 A | 11/1978 | Sheridon |
| 4,143,103 A | 3/1979 | Sheridon |
| 4,203,106 A | 5/1980 | Dalisa et al. |
| 4,218,302 A | 8/1980 | Dalisa et al. |
| 4,231,641 A | 11/1980 | Randin |
| 4,261,653 A | 4/1981 | Goodrich |
| 4,330,788 A | 5/1982 | Hinz et al. |
| 4,345,249 A | 8/1982 | Togashi |
| 4,368,952 A | 1/1983 | Murata et al. |
| 4,390,403 A | 6/1983 | Batchelder |
| 4,407,565 A | 10/1983 | Saxe |
| 4,418,346 A | 11/1983 | Batchelder |
| 4,419,383 A | 12/1983 | Lee |
| 4,430,648 A | 2/1984 | Togashi et al. |
| 4,435,047 A | 3/1984 | Fergason |
| 4,438,160 A | 3/1984 | Ishikawa et al. |
| 4,450,440 A | 5/1984 | White |
| 4,509,828 A | 4/1985 | Clerc et al. |
| 4,522,472 A | 6/1985 | Liebert et al. |
| 4,598,960 A | 7/1986 | DiSanto et al. |
| 4,643,528 A | 2/1987 | Bell, Jr. |
| 4,648,956 A | 3/1987 | Marshall et al. |
| 4,655,897 A | 4/1987 | DiSanto et al. |
| 4,703,573 A | 11/1987 | Montgomery et al. |
| 4,732,830 A | 3/1988 | DiSanto et al. |
| 4,741,604 A | 5/1988 | Kornfeld |
| 4,742,345 A | 5/1988 | DiSanto et al. |
| 4,746,917 A | 5/1988 | DiSanto et al. |
| 4,772,820 A | 9/1988 | DiSanto et al. |
| 4,776,675 A | 10/1988 | Takaochi et al. |
| 4,833,464 A | 5/1989 | DiSanto et al. |
| 4,850,919 A | 7/1989 | DiSanto et al. |
| 4,947,157 A | 8/1990 | DiSanto et al. |
| 4,947,159 A | 8/1990 | DiSanto et al. |
| 4,948,232 A | 8/1990 | Lange |
| 5,041,824 A | 8/1991 | DiSanto et al. |
| 5,053,763 A | 10/1991 | DiSanto et al. |
| 5,066,105 A | 11/1991 | Yoshimoto et al. |
| 5,077,157 A | 12/1991 | DiSanto et al. |
| 5,105,185 A | 4/1992 | Nakanowatari et al. |
| 5,109,354 A | 4/1992 | Yamashita et al. |
| 5,119,218 A | 6/1992 | Yoshimoto et al. |
| 5,128,785 A | 7/1992 | Yoshimoto et al. |
| 5,167,508 A | 12/1992 | McTaggart |
| 5,174,882 A | 12/1992 | DiSanto et al. |
| 5,177,476 A | 1/1993 | DiSanto et al. |
| 5,187,609 A | 2/1993 | DiSanto et al. |
| 5,216,416 A | 6/1993 | DiSanto et al. |
| 5,216,530 A | 6/1993 | Pearlman et al. |
| 5,220,316 A | 6/1993 | Kazan |
| 5,223,115 A | 6/1993 | DiSanto et al. |
| 5,223,823 A | 6/1993 | Disanto et al. |
| 5,247,290 A | 9/1993 | DiSanto et al. |
| 5,250,938 A | 10/1993 | DiSanto et al. |
| 5,254,981 A | 10/1993 | DiSanto et al. |
| 5,262,098 A | 11/1993 | Crowley et al. |
| 5,266,937 A | 11/1993 | DiSanto et al. |
| 5,270,843 A | 12/1993 | Wang |
| 5,276,438 A | 1/1994 | DiSanto et al. |
| 5,279,694 A | 1/1994 | DiSanto et al. |
| 5,293,528 A * | 3/1994 | DiSanto et al. ............... 345/107 |
| 5,302,235 A | 4/1994 | DiSanto et al. |
| 5,304,439 A | 4/1994 | DiSanto et al. |
| 5,315,312 A | 5/1994 | DiSanto et al. |
| 5,316,341 A | 5/1994 | Schwartz |
| 5,344,594 A | 9/1994 | Sheridon |
| 5,345,251 A | 9/1994 | DiSanto et al. |
| 5,357,355 A | 10/1994 | Arai |
| 5,359,346 A | 10/1994 | DiSanto et al. |
| 5,377,258 A | 12/1994 | Bro |
| 5,383,008 A | 1/1995 | Sheridon |
| 5,389,945 A | 2/1995 | Sheridon |
| 5,398,131 A | 3/1995 | Hall et al. |
| 5,402,145 A | 3/1995 | DiSanto et al. |
| 5,407,231 A | 4/1995 | Schwartz |
| 5,411,656 A | 5/1995 | Schubert |
| 5,412,398 A | 5/1995 | DiSanto et al. |
| 5,460,688 A | 10/1995 | DiSanto et al. |
| 5,467,107 A | 11/1995 | DiSanto et al. |
| 5,484,292 A | 1/1996 | McTaggart |
| 5,485,176 A | 1/1996 | Ohara et al. |
| 5,499,038 A | 3/1996 | DiSanto et al. |
| 5,508,068 A | 4/1996 | Nakano |
| 5,508,720 A | 4/1996 | DiSanto et al. |
| 5,512,162 A | 4/1996 | Sachs et al. |
| 5,534,888 A * | 7/1996 | Lebby et al. .................. 345/672 |
| 5,535,027 A | 7/1996 | Kimura et al. |
| 5,538,430 A | 7/1996 | Smith et al. |
| 5,561,443 A | 10/1996 | DiSanto et al. |
| 5,565,885 A | 10/1996 | Tamanoi |
| 5,573,711 A | 11/1996 | Hou et al. |
| 5,576,867 A | 11/1996 | Baur et al. |
| 5,604,027 A | 2/1997 | Sheridon |
| 5,625,460 A | 4/1997 | Tai |
| 5,627,561 A | 5/1997 | Laspina et al. |
| 5,642,211 A | 6/1997 | Okano et al. |
| 5,643,673 A | 7/1997 | Hou |
| 5,650,872 A | 7/1997 | Saxe et al. |
| 5,675,719 A | 10/1997 | Matias et al. |
| 5,684,365 A | 11/1997 | Tang et al. |
| 5,684,500 A * | 11/1997 | Morin et al. .................... 345/92 |
| 5,689,282 A | 11/1997 | Wolfs et al. |
| 5,694,224 A | 12/1997 | Tai |
| 5,707,738 A | 1/1998 | Hou |
| 5,708,525 A | 1/1998 | Sheridon |
| 5,717,514 A | 2/1998 | Sheridon |
| 5,717,515 A | 2/1998 | Sheridon |
| 5,729,663 A | 3/1998 | Lin et al. |
| 5,737,115 A | 4/1998 | Mackinlay et al. |
| 5,745,094 A | 4/1998 | Gordon, II et al. |
| 5,760,761 A | 6/1998 | Sheridon |
| 5,777,782 A | 7/1998 | Sheridon |
| 5,783,368 A | 7/1998 | Richter et al. |
| 5,808,783 A | 9/1998 | Crowley |
| 5,818,556 A | 10/1998 | Havens et al. |
| 5,852,427 A | 12/1998 | Buzak |
| 5,872,552 A | 2/1999 | Gordon, II et al. |
| 5,892,504 A | 4/1999 | Knapp |
| 5,896,117 A | 4/1999 | Moon |
| 5,898,416 A | 4/1999 | Kuijk et al. |
| 5,900,192 A * | 5/1999 | Richley ............................ 264/8 |
| 5,904,545 A | 5/1999 | Smith et al. |
| 5,930,026 A | 7/1999 | Jacobson et al. |
| 5,961,804 A | 10/1999 | Jacobson et al. |
| 5,978,052 A | 11/1999 | Ilcisin et al. |
| 6,002,384 A | 12/1999 | Tamai et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,057,814 A | 5/2000 | Kalt |
| 6,064,784 A | 5/2000 | Whitehead et al. |
| 6,067,185 A | 5/2000 | Albert et al. |
| 6,081,285 A | 6/2000 | Wen et al. |
| 6,097,531 A | 8/2000 | Sheridon |
| 6,113,810 A | 9/2000 | Hou et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |

| | | |
|---|---|---|
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,421,033 B1 | 7/2002 | Williams et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,633,306 B1 | 10/2003 | Marz et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,727,882 B1 | 4/2004 | Large et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2002/0180687 A1 | 12/2002 | Webber |
| 2003/0011560 A1 | 1/2003 | Albert et al. |
| 2003/0102858 A1 | 6/2003 | Jacobson et al. |
| 2003/0132908 A1 | 7/2003 | Herb et al. |
| 2003/0151702 A1 | 8/2003 | Morrison et al. |
| 2003/0222315 A1 | 12/2003 | Amundson et al. |
| 2004/0014265 A1 | 1/2004 | Kazlas et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0136048 A1 | 7/2004 | Arango et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0226820 A1 | 11/2004 | Webber et al. |
| 2004/0239614 A1 | 12/2004 | Amundson et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0001812 A1 | 1/2005 | Amundson et al. |
| 2005/0007336 A1 | 1/2005 | Albert et al. |
| 2005/0012980 A1 | 1/2005 | Wilcox et al. |
| 2005/0017944 A1 | 1/2005 | Albert |
| 2005/0018273 A1 | 1/2005 | Honeyman et al. |
| 2005/0024353 A1 | 2/2005 | Amundson et al. |
| 2005/0035941 A1 | 2/2005 | Albert et al. |
| 2005/0062714 A1 | 3/2005 | Zehner et al. |
| 2005/0067656 A1 | 3/2005 | Denis et al. |
| 2005/0078099 A1 | 4/2005 | Amundson et al. |
| 2005/0105159 A1 | 5/2005 | Paolini, Jr. et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0122565 A1 | 6/2005 | Doshi et al. |
| 2005/0151709 A1 | 7/2005 | Jacobson et al. |
| 2005/0152022 A1 | 7/2005 | Honeyman et al. |
| 2005/0156340 A1 | 7/2005 | Valianatos et al. |
| 2005/0168799 A1 | 8/2005 | Whitesides et al. |
| 2005/0168801 A1 | 8/2005 | O'Neil et al. |
| 2005/0179642 A1 | 8/2005 | Wilcox et al. |
| 2005/0270261 A1 | 12/2005 | Danner et al. |

FOREIGN PATENT DOCUMENTS

| | | |
|---|---|---|
| EP | 0 443 571 A2 | 8/1991 |
| EP | 0 618 715 A1 | 10/1994 |
| EP | 1 099 207 B1 | 3/2002 |
| EP | 1 145 072 B1 | 5/2003 |
| JP | 59-098227 A | 6/1984 |
| JP | 62-058222 A | 3/1987 |
| JP | 62-231930 A | 10/1987 |
| JP | 03-091722 A | 4/1991 |
| JP | 03-096925 A | 4/1991 |
| JP | 03-118196 A | 5/1991 |
| JP | 05-173194 A | 7/1993 |
| JP | 09-185087 A | 7/1997 |
| JP | 11-219135 A | 8/1999 |

| | | |
|---|---|---|
| JP | 2000-322004 | 11/2000 |
| WO | WO 95/06307 | 3/1995 |
| WO | WO 00/36560 | 6/2000 |
| WO | WO 00/38000 | 6/2000 |
| WO | WO 00/67110 | 11/2000 |
| WO | WO 01/07961 | 2/2001 |

OTHER PUBLICATIONS

Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Ballinger, D.O., "Magnetic recording paper is erasable", Electronics, Mar. 1, 1973, pp. 73-76.
Beilin, S., et al, "8.5: 2000-Character Electrophoretic Display", SID 86 Digest, 136 (1986).
Blazo, S.F., "High Resolution Electrophoretic Display with Photoconductor Addressing", SID Digest 1982, p. 152.
Bohnke et al., "Polymer-Based Solid Electrochromic Cell for Matrix-Addressable Display Devices." J. Electrochem. Soc., 138, 3612 (1991).
Bouchard, A. et al., "High-Resolution Microencapsulated Electrophoretic Display on Silicon", SID 04 Digest, 651 (2004).
Bryce, M.R., "Seeing through synthetic metals", Nature, 335. 12 (1988).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Chiang, A., "Reduction of Lateral Migration in Matrix Addressed Electrophoretic Display", Xerox Disclosure Journal, 5, 73 (1980).
Chiang, A., et al., "A High Speed Electrophoretic Matrix Display", SID 80 Digest (1980), 114.
Clarisse, C., et al., "Field-Effect Transistor with Diphthalocyanine Thin Film", Elec. Letters, 24, 675 (1988).
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Dalisa, A., "Electrophoretic Display Technology", Proceedings of the SID (1977).
Dalisa, A.L., "Electrophoretic Display Technology", IEEE Trans. Electron Dev., ED-24, 827 (1977).
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Egashira,. N., et al., "Solid electrochromic cell consisting of Lu-diphthalocyanine and lead fluoride", Proceedings of the SID, 28, 227 (1987).
Gutcho, M.H., Microcapsules and MIcroencapsulation Techniques, Noyes Data Corp., Park Ridge NJ, (1976).
Hatano, T., et al., "18:3: Bistable Paper-White Display Device Using Cholesteric Liquid Crystals", SID 96 Digest, 269 (1996).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Hopper, M.A., et al., "An Electrophoretic Display, Its Properties, Model and Addressing", IEEE Trans. Electron Dev., ED-26, 1148 (1979).
Hosaka, H., et al., "Electromagnetic microrelays: concepts and fundamental characteristics", Sensors and Actuators A, 40, 41 (1994).
Jacobson, J., et al., "The last book", IBM Systems J., 36, 457 (1997).
Ji, Y., et al., "P-50: Polymer Walls in Higher-Polymer-Content Bistable Reflective Cholesteric Displays", SID 96 Digest, 611 (1996).

Jin et al., "Optically Transparent, Electrically Conductive Composite Medium", Science, 255, 446 (1992).
Jo, G-R, et al., "Toner Display Based on Particle Movements", Chem. Mater, 14, 664 (2002).
Kazlas, P. et al., "Card-size Active-matrix Electronic Ink Display", Eurodisplay 2002, 259 (2002).
Kazlas, P., et al., "12.1 SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
Kornfeld, A Defect-Tolerant Active-Matrix Electrophoretic Display, SID Digest, 1984, p. 142.
Lee, L.L., "Fabrication of Magnetic Particles Displays", Proceedings of the SID, 18, 283 (1977).
Moesner, F.M., et al., "Devices for Particle Handling by an AC Electric Field", IEEE, 1995, p. 66.
Murau, P., "Characteristics of an X-Y Addressed Electrophoretic Image Display (EPID)," SID 84 Digest (1984) p. 141.
O'Regan, B. et al., "A Low Cost, High-efficiency Solar Cell Based on Dye-sensitized colloidal TiO2 Films", Nature, vol. 353, Oct. 24, 1991, 773-740.
Pankove, "Color Reflection Type Display Panel", RCA Technical Notes, Mar. 1962, No. 535.
Pearlstein, "Electroless Plating", in Lowenheim (ed.), Modern Electroplating, Wiley, New York (1976), pp. 710-747.
Pitt, M.G., et al., "Power Consumption of Microencapsulated Electrophoretic Displays for Smart Handheld Applications", SID 02 Digest, 1378 (2002).
Platt, C., "Digital Ink," Wired, May 1997, p. 162.
Quon, W.S., "Multilevel Voltage Select (MLVS): A Novel Technique to X-Y Address an Electrophoretic Display", Correspondence, 1977, pp. 1120-1123.
Saitoh, M., et al., "A newly developed electrical twisting ball display", Proceedings of the SID, 23, 249 (1982).
Sheridon, N.K., et al., "A Photoconductor-Addressed Electrophoretic Cell for Office Data Display", SID 82 Digest, 94 (1982).
Sheridon, N.K., et al., "The Gyricon—A Twisting Ball Display", Proceedings of the SID, 18, 289 (1977).
Shiffman, R.R., et al., "An Electrophoretic Image Display with Internal NMOS Address Logic and Display Drivers," Proceedings of the SID, 1984, vol. 25, 105 (1984).
Shiwa, S., et al., "Electrophoretic Display Method Using Ionographic Technology," SID 88 Digest (1988), p. 61.
Singer, B., et al., "An X-Y Addressable Electrophoretic Display," Proceedings of the SID, 18, 255 (1977).
Tannas et al., "Flat-panel displays: a critique", IEEE Spectrum, Jul. 1978, p. 27.
Vaz, N.A., et al., "Dual-frequency addressing of polymer-dispersed liquid-crystal films", J. Appl. Phys., 65, 5043 (1989).
Vizard, F., :Electric Tales: Computer chips replace wood chips in the pages of 21st century books, Popular Science (1997).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Wrighton, M.S. et al., "Photoelectrolysis of Water by Irradiation of Platinized n-Type Semiconducting Metal Oxides," Journal of Solid State Chemistry, 1977, No. 22, pp. 17-19.
Yamaguchi, M., et al., "Equivalent Circuit of Ion Projection-Driven Electrophoretic Display," IEICE Transactions, 74, 4152 (1991).
Yamaguchi, Y., et al., "Toner display using insulative particles charged triboelectrically", Asia Display/IDW '01, p. 1729, Paper AMD4-4 (2001).
Yang, Y., et al., "A new architecture for polymer transistors", Nature, 372, 344 (1994).
Zehner, R. et al., "Drive Waveforms for Active Matrix Electrophoretic Displays", SID 03 Digest, 842 (2003).

* cited by examiner

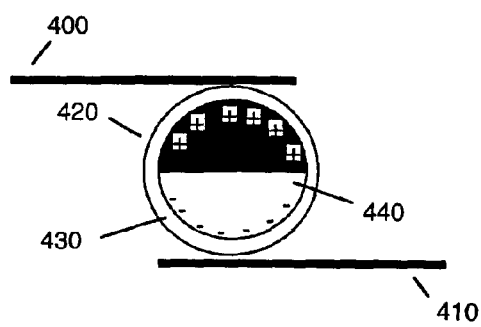
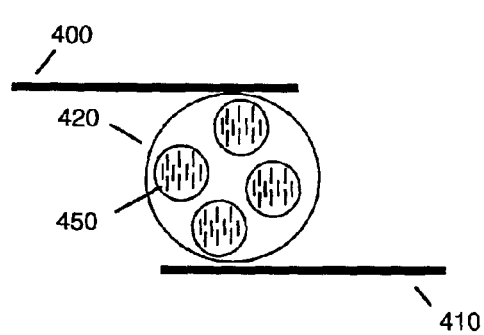
Fig. 12A          Fig. 12B
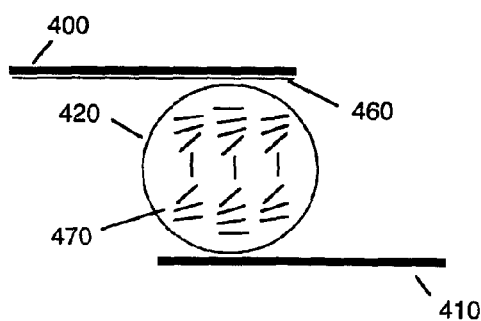
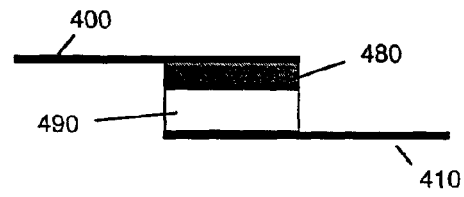
Fig. 12C          Fig. 12D

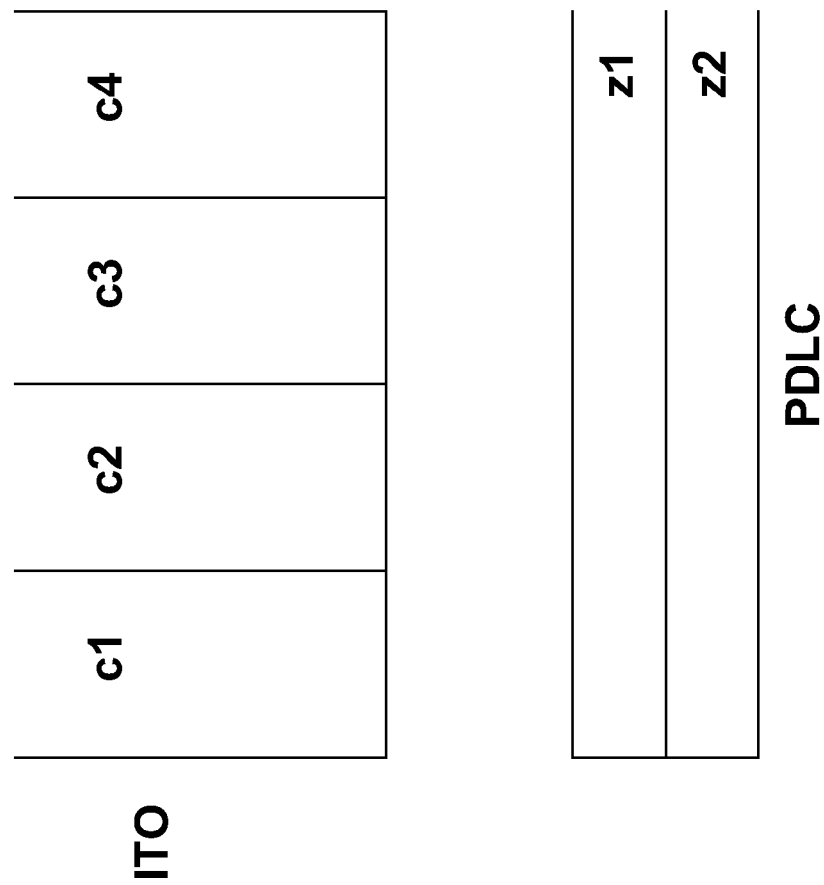
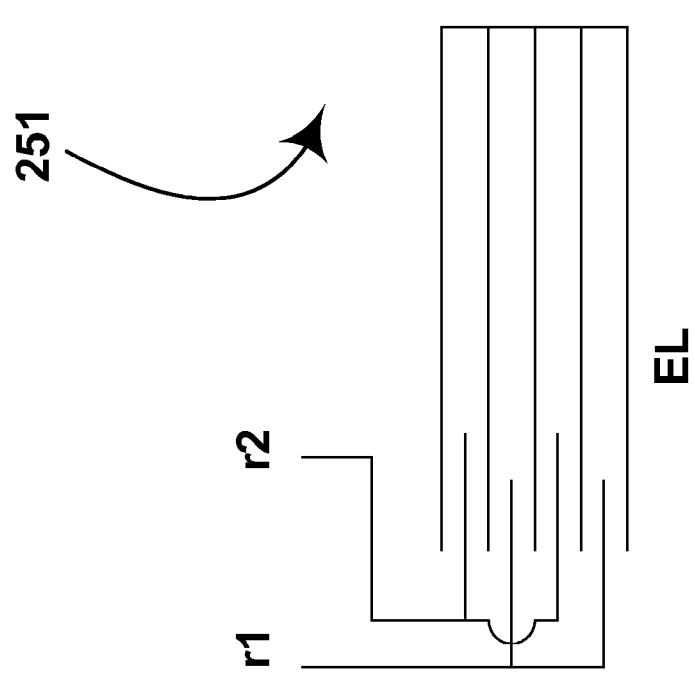
Fig. 21

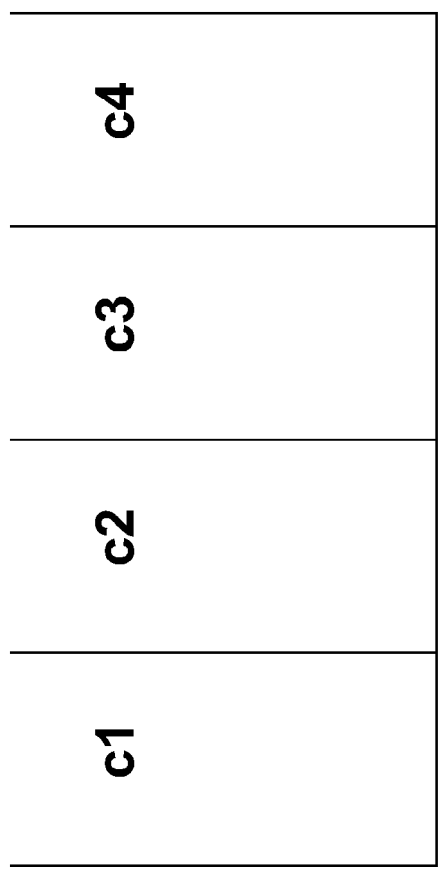
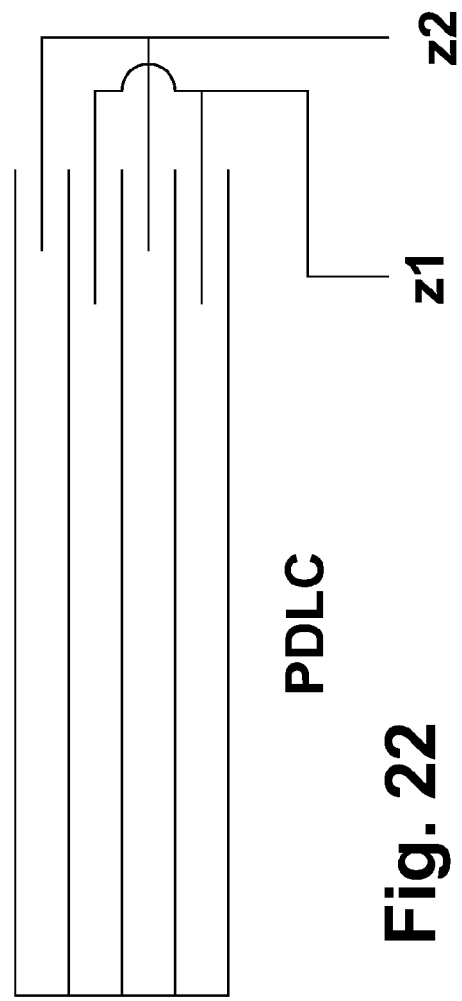
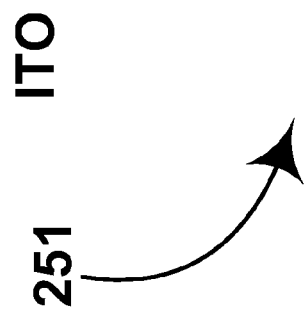
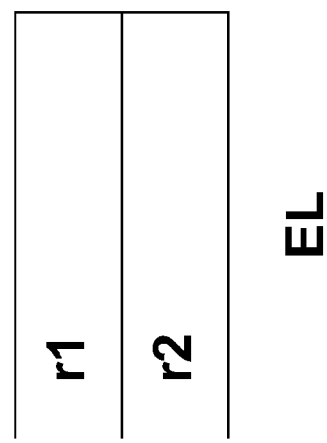
Fig. 22

US 8,139,050 B2

ADDRESSING SCHEMES FOR ELECTRONIC DISPLAYS

REFERENCE TO RELATED APPLICATIONS

This application is a continuation-in-part of application Ser. No. 09/683,179, filed Nov. 29, 2001 (Publication No. 2003/0063661, now U.S. Pat. No. 7,023,420), which itself claims benefit of Provisional Application Ser. No. 60/253, 892, filed Nov. 29, 2000. This application is also a continuation-in-part of application Ser. No. 08/983,404, filed Mar. 26, 1999 (now U.S. Pat. No. 7,106,296), which is the U.S. national phase of International Application PCT/US96/12000 (Publication No. WO 97/04398), filed Jul. 19, 1996, which in turn is (as regards the United States of America) a continuation-in-part of application Ser. No. 08/504,896, filed Jul. 20, 1995 (now U.S. Pat. No. 6,124,851).

The entire disclosures of all the aforementioned applications, and of all U.S. patents and published and copending applications mentioned below, are herein incorporated by reference.

BACKGROUND OF INVENTION

The present invention relates to addressing schemes for electronic displays, that is to say displays which use a display medium at least one optical characteristic of which can be varied by subjecting the medium to an electric field.

Electronic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

One important sub-group of electronic displays are electrophoretic displays, which have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist without power for at least several times, for example at least four times, the minimum duration of the addressing pulse required to change the state of the display element.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; and 6,312,304, and in International Applications Publication Nos. WO 97/04398; WO 98/03896; WO 98/19208; WO 98/41898; WO 98/41899; WO 99/10769; WO 99/10768; WO 99/10767; WO 99/53373; WO 99/56171; WO 99/59101; WO 99/47970; WO 00/03349; WO 00/03291; WO 99/67678; WO 00/05704; WO 99/53371; WO 00/20921; WO 00/20922; WO 00/20923; WO 00/26761; WO 00/36465; WO 00/38000; WO 00/38001; WO 00/36560; WO 00/36666; WO 00/59625; WO 00/60410; WO 00/67110; WO 00/67327; WO 01/02899; WO 01/07691; WO 01/08242; WO 01/17029; WO 01/17040; and WO 01/80287.

An encapsulated, electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

It is shown in copending application Ser. No. 60/280,951, filed Apr. 2, 2001 that some particle-based electrophoretic are capable of gray scale and that such gray scale displays are stable not only in their extreme black and white states but also in their intermediate gray states. Methods to achieve gray states include spatial, temporal and voltage addressing methods such as dithering, time-width modulation, and voltage-height modulation. Thus, this type of display is properly called "multi-stable" rather than bistable, although the latter term may be used for convenience herein.

The bistable or multi-stable behavior of electrophoretic displays (and other electro-optic displays displaying similar behavior) is in marked contrast to that of conventional liquid crystal ("LC") displays. Twisted nematic liquid crystals are not bi- or multi-stable but act as essentially instantaneous voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, a pixel of an LC display is not sensitive to the polarity of the electric field, only to its magnitude, and indeed to avoid undesirable effects, such as damage to electrodes, caused by current imbalance through a display, commercial LC displays usually reverse the polarity of the driving field at frequent intervals. In contrast, electrophoretic displays act as impulse transducers, so that the final state of a pixel depends not only upon the electric field applied and the time for which this field is applied, but also upon the state of the pixel prior to the application of the electric field.

The bistable or multi-stable (also sometimes referred to as "latching" or "memory") characteristics of electrophoretic displays affect the choice of addressing methods to be used with such displays. Other factors which influence the choice of addressing methods to be used include the need for DC addressing because of the sensitivity of electrophoretic displays to the polarity of the electric field, and the desirability of DC-balanced waveforms; to avoid potentially harmful changes at the electrodes, it is desirable that the algebraic sum of the impulses applied to any given pixel of an electrophoretic display over time be zero. Also, the addressing method should allow for the lack of a threshold in electrophoretic displays; since such displays are impulse transducers, with a nearly linear relationship between (a) the product of voltage and time and (b) the change in optical characteristic of the display, even a small voltage applied for a substantial time will cause a change in the optical characteristic of the display. This normally precludes the use of passive matrix addressing methods.

Frequently, high resolution electrophoretic displays consist of pixels laid out in an array, with a transistor construction behind each pixel in a so-called "active matrix" arrangement. This arrangement can further be subdivided into sub-pixels. However all the transistors are in a plane, and control an array of bottom electrodes that are either on the same plane or on an adjacent plane just above or below. As such, the array is addressed in a two-dimensional or XY manner where pixels are referenced by row and column.

One problem with such high resolution displays is the sheer number of drivers required. In an array addressed in an XY manner, if there are x columns and y rows, x+y drivers are needed to address x*y pixels. For example, a color 640×480 display with three sub-pixels per pixel has 640×480×3=921,600 pixels and would typically be addressed by 480 row drivers and 1920 column drivers for a total of 2400 display drivers. Especially in small displays, the cost of the drivers rivals or may outweigh the cost of the electro-optic material.

In one aspect, the present invention provides an electronic display which reduces the number of drivers required.

Another problem with such high resolution displays is the time taken to address the display. Normally, in an active matrix display, one row of the display is activated at a time, and all the pixels in that row are addressed by applying appropriate voltages to the various columns. If addressing one row takes k seconds, at least k*y seconds are required to address the complete display. If the addressing scheme used requires that each row be addressed for the time necessary to completely address an electrophoretic medium (which is typically of the order of 100 milliseconds), the total time taken to address the display may be undesirably great. Similar considerations apply to displays using other types of electro-optic materials.

In another aspect the present invention provides various methods for reducing the time needed to completely address an electronic display.

SUMMARY OF INVENTION

Accordingly, in one aspect, this invention provides an electronic display comprising an electro-optic material having a plurality of pixels, and separate first, second and third sets of addressing means for addressing the pixels, each of the pixels being associated with one addressing means in each of the three sets, such that any specific pixel of the display can be addressed by application of signals within predetermined ranges to each of the three addressing means associated with that specific pixel.

This invention also provides an electronic display comprising an electro-optic material having a plurality of separately addressable pixels, wherein the number of driver outputs to the pixels is less than the square root of the number of pixels.

In another aspect, this invention provides a method of addressing an electronic display, the method comprising:
  providing an electro-optic material having a plurality of pixels;
  providing first, second and third sets of addressing means for addressing the pixels, each of the pixels being associated with one addressing means in each of the three sets; and
  applying predetermined signals to the three addressing means associated with a specific pixel, thereby addressing this pixel.

This type of addressing method will hereinafter be called "three-dimensional addressing" and the corresponding display may be called a "three-dimensional display", it being understood that this does not necessarily imply that the pixels of the display have substantial extent in all three dimensions; for example, the pixels might be arranged in a large planar array, but electrically grouped into sub-arrays for purposes of addressing the display, with the selection of any one sub-array being made by the third set of addressing means.

In another aspect, this invention provides a method of addressing a bistable electronic display having a plurality of pixels arranged in an array comprising a plurality of rows and plurality of columns, the method comprising selecting a plurality of rows or columns and applying a simultaneous and equivalent switching impulse to all selected rows and columns.

In another aspect, this invention provides a method of addressing a bistable electronic display having a plurality of pixels arranged in a plurality of rows, the method comprising:
  (a) comparing a starting state of the display with a desired finishing state and determining for each pixel a change value representative of the change needed to change the starting state of that pixel to its desired finishing state; and
  (b) calculating from the pixel change values for each row, a switch direction value for that row, this switch direction value representing the value for which, if all pixels in that row were changed by the switch direction value, the row switch time required to switch the row to the desired finishing state would be minimized.

This method may also include any one or more of the following steps:
  (c) calculating the average switch direction value for all rows of the display;
  (d) identifying all rows with switch direction values less than the average switch direction value calculated in step (c);
  (e) calculating the average switch direction value of all rows identified in step (d);
  (f) applying to all rows identified in step (d) an impulse sufficient to cause a change in state equal to the average switch direction value calculated in step (e);
  (g) identifying all rows with switch direction values greater than the average switch direction value calculated in step (c);
  (h) calculating the average switch direction value of all rows identified in step (g); and (i) applying, to all rows identified in step (g), an impulse sufficient to cause a change in state equal to the average switch direction value calculated in step (g).

In another aspect, this invention provides a method of addressing a bistable electronic display having a plurality of pixels, each of these pixels having a first display state, a second display state differing in at least one optical characteristic from the first display state, and a plurality of intermediate states having values of this optical characteristic intermediate those of the first and second display states. The method comprises driving all the pixels of the display to the same one of the intermediate states; and thereafter addressing the pixels individually to drive them to their desired states.

In another aspect, this invention provides a method of addressing a bistable electronic display having a plurality of pixels arranged in a plurality of rows and columns. The method comprises:
  (a) comparing a starting state of the display with a desired finishing state and determining for each pixel a change value representative of the change needed to change the starting state of that pixel to its desired finishing state;
  (b) comparing the change values of pixels in differing rows but the same column and locating at least two of these pixels having the same change value; and
  (c) addressing these at least two pixels having the same value simultaneously by addressing the rows and the column on which these pixels are located.

In another aspect this invention provides a method of addressing a bistable electronic display having a plurality of pixels, the method comprising comparing a starting state of the display with a desired finishing state and determining which pixels differ between the two states; and addressing only those pixels which differ between the two states.

Finally, this invention provides a method of addressing a bistable electronic display having a plurality of pixels. This method comprises:
  providing an array of island capacitors associated with the pixels of the display;
  through passive matrix XY addressing, introducing electrical charge into the capacitors in a pattern matching the image desired on the display; and
  thereafter allowing the charges on the capacitors to complete the addressing of the pixels of the display.

BRIEF DESCRIPTION OF DRAWINGS

FIGS. 12A-12D are schematic details of various electronically addressable contrast media.

FIGS. 18-22 illustrate five different three-dimensionally addressed displays of the present invention, all of which use a photoconductor as part of an addressing method using light sources and light valves.

Figure 1:
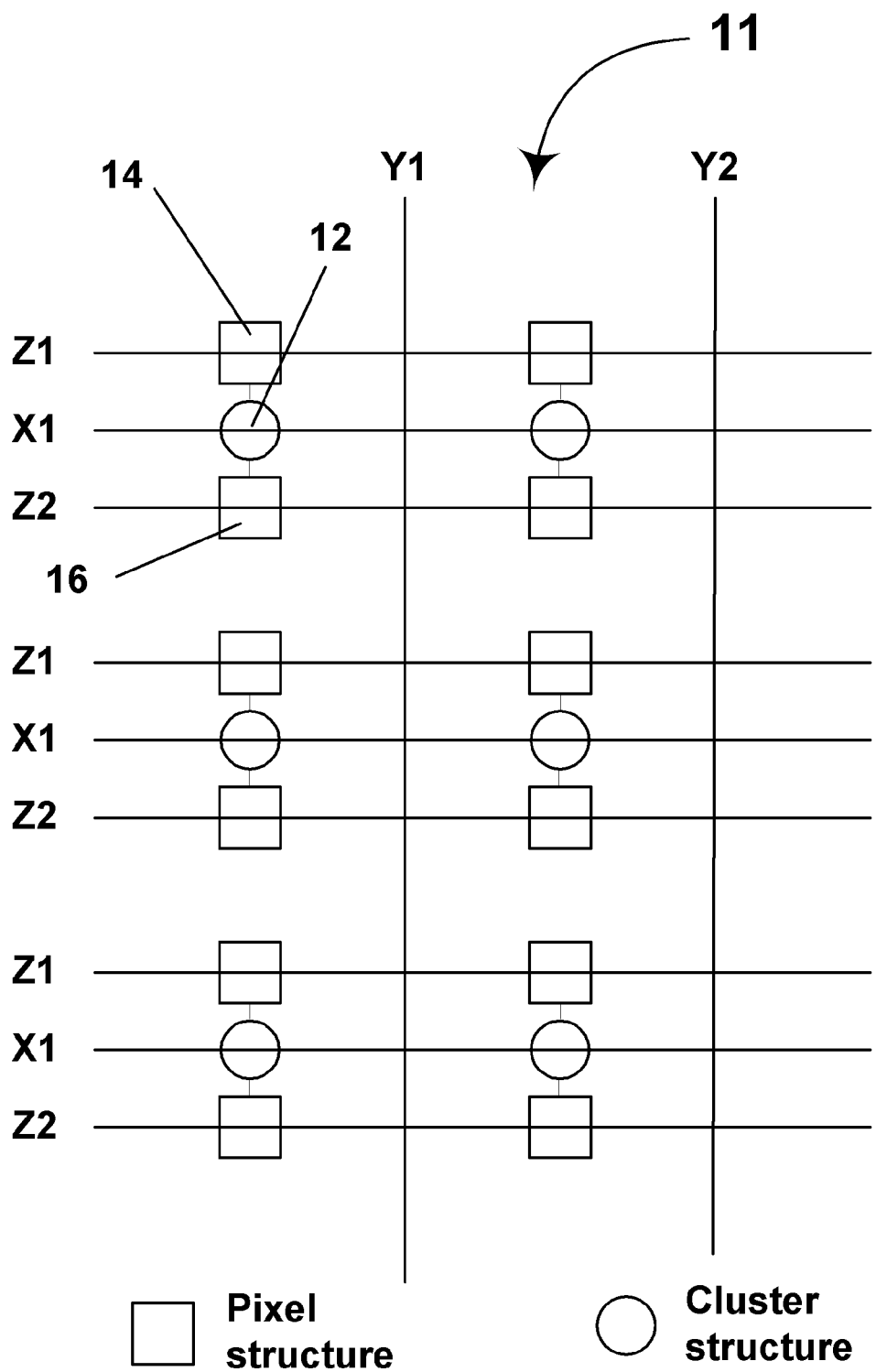
FIGS. 1, 2 and 3 of the accompanying drawings are schematic circuit diagrams of first, second and third three-dimensionally addressed displays of the present invention.

The accompanying drawings are highly schematic and not to scale, emphasis instead generally being placed upon illustrating the principles of the invention.

DETAILED DESCRIPTION

As already mentioned, the three dimensional displays and methods of the present invention use an electro-optic material having a plurality of pixels, and separate first, second and third sets of addressing means for addressing the pixels. In this display and method, each of the pixels is associated with one addressing means in each of the three sets, such that addressing of any specific pixel requires application of signals within predetermined ranges to each of the three addressing means associated with that specific pixel. The additional dimension is accomplished by introducing a method of addressing sub-arrays within the array. By thus substituting a three-dimensional addressing scheme for a two-dimensional one, the number of drivers can be greatly reduced. In effect, the present invention splits the display into z regions, each addressable by the x columns and y rows, enabling the entire display of x*y*z pixels to be addressed by x+y+z drivers. For example, the aforementioned color 640×480 display with three sub-pixels per pixel could be addressed by 64 columns and 240 rows replicated across 60 regions for a total of 364 drivers for the same 921,600 pixels, reducing driver cost substantially. In this and many other cases of practical interest, the present invention enables the number of drivers (or more accurately driver outputs), to be reduced to less than the square root of the number of pixels in the display, a highly desirable result which cannot be achieved by conventional addressing methods. The additional dimension may comprise only a logical sub-array, or may include a physical sub-array that may even comprise an additional layer in the display stack.

In the three-dimensional display of the present invention, in which the pixels are arranged in a plurality of sub-arrays, each pixel within any specific sub-array can be associated with one of the first and second sets of addressing means, and the third set of addressing means can have the form of a plurality of switching means, at least one of which is associated with each sub-array, the switching means associated with each sub-array having an off state, in which signals on at least one of the first and second sets of addressing means are prevented from reaching the associated sub-array, and an on state, in which signals from both the first and second sets of addressing means are permitted to reach and address the associated sub-array. Such a display may have control means arranged to control the switching means so that only the switching means associated with one sub-array is in its on state at any given moment.

Thus, for example, the additional layer of logic may consist of a platform hierarchy. In this hierarchy, one transistor may act as a gate that controls additional transistors. This may be accomplished physically by wiring a cluster of transistors to a central transistor. The central transistor may be in the same plane as the pixel transistors or may be in a different layer but still in electrical communication. In this approach the cluster-level transistor and the pixel-level transistor can be individual transistors or whole logic structures capable of some degree of intelligence and processing. The cluster transistors may be addressed in an XY manner with an addressing signal that communicates how the sub-array should be addressed. This hierarchy may be repeated in multiple logical or physical layers, permitting many pixels to be addressed by a few central transistors.

Because of the bistable nature of electrophoretic displays, one way to utilize the hierarchy involves first setting the cluster logic structures to open electrical communication to one (or a subset in parallel) of the downstream pixels. These pixels are then addressed by an XY scan. The clusters are then reset to open communication with a different set of downstream pixels. These pixels are then addressed by an XY scan; however the image from the first set of pixels is not lost because it remains visible even when not being addressed.

In one form of the invention using sub-arrays, each sub-array comprises a discrete page, the pages formed by the plurality of sub-arrays being stacked on top of each other so that the entire display forms a multi-page electronic book. Thus, this invention provides economical devices that look and feel like multi-page books. Such a book may have conductive vias extending between adjacent pages and connecting at least one of the first and second sets of addressing means on the adjacent pages. Display of this type are described below with reference to FIGS. 4-17. Alternatively, each sub-array may correspond to a different column in a newspaper, and thus the present invention provides a large paper-like display the size of a newspaper broadsheet that may be economically addressed.

As already indicated, in the three-dimensional display of the present invention, the first, second and third sets of addressing devices can all have the form of electrical conductors and/or electronic devices, typically transistors. However, the present invention is not restricted to this purely electrically or electronic approach. In another approach, the operation of sub-arrays within a basic pixel array are made contingent on an external gate based on temperature, light, vibration, magnetism, radio waves, or other suitable force. For example, suppose the pixel-level logic structures comprise microelectromechanical system (MEMS) devices with a metal see-saw switch that cannot move in the presence of a magnetic field. An array of such structures is addressed with XY coordinates. However, adjacent to such array is a layer of material capable of emitting a magnetic field, this layer being divided into halves. When only one half is active, only half the display can be addressed. Suppose that the Y addressing means are wired in parallel so that activating the Yth column activates two columns, one in each half. Only the column not in the magnetic field actually causes switching to occur. In this manner, the magnetic layer provides another addressing dimension, permitting three-dimensional addressing.

The three-dimensional addressing methods of the present invention may be especially useful when at least one of the sets of addressing devices makes use of a photoconductor. The display may comprise a light source (for example, a light-emitting layer) associated with the photoconductor and selectively operable to switch the photoconductor between a conductive and a non-conductive state. The light source may be an electroluminescent material. Alternatively, the display may comprise a light source associated with the photoconductor and a light valve disposed between the light source and the photoconductor and arranged to control transmission of light from the light source to the photoconductor. Any suitable light valve may be used, including light valves operating by use of polymer-dispersed liquid crystal (PDLC), suspended particle and electrochromicity. A PDLC light valve is a preferred embodiment due to the relative ease of obtaining thin sheets of such media at low cost.

Although using light valves has the disadvantages that a large proportion of the light emitted from the light-emitting layer is wasted, reducing device lifetime, and an additional layer is required, thickening the medium and complicating manufacture, these disadvantages tend to be outweighed by the major advantage that light valve layers can be made inexpensive and flexible.

There are a variety of arrangements available with light valves. For example, in one embodiment, the display may comprise a plurality of light sources arranged as a series of elongate rows, and a plurality of light valves arranged as series of elongate columns crossing the elongate rows, the light sources and light valves together defining a two-dimensional array of pixels in the photoconductor. In another embodiment, the display may have the form of a plurality of pages stacked on top of one another to form a multi-page electronic display, and each page may have a single light source and a single light valve, so that the page or pages to be written at any given moment are selected by controlling the state of the light valves. In a further embodiment, the first addressing means comprises a plurality of electrical conductors and means for applying potentials selectively to these conductors, the second addressing means comprises a plurality of light emitting devices and means for generating light selectively from these light emitting devices, and the third addressing means comprises a plurality of light valves and means for selectively setting these light valves to their transmissive or non-transmissive states.

One convenient application of the three-dimensional addressing schemes of the present invention is in electronic displays having three sets of pixels arranged to display different colors. In this type of display, the third set of addressing means may be arranged to select one of the three sets of pixels to be addressed at any given moment. A display of this type is described below with reference to FIG. 20.

The present display and method are not restricted to the use of only three dimensions for addressing. A display of the present invention may comprise a fourth set of addressing means for addressing the pixels, this fourth set being separate from the first, second and third sets of addressing means. Each of the pixels of the display is associated with one addressing means in each of the four sets, such that addressing of any specific pixel of the display requires application of signals within predetermined ranges to each of the four addressing means associated with that specific pixel, thus providing a four-dimensional addressing scheme. For example, in the embodiment of the invention described above which simulates a broadsheet newspaper, it may be convenient to divide the large display into a two-dimensional grid of sub-arrays, each sub-array being addressed in the conventional XY manner by the first and second sets of addressing means, while the selection of the sub-array to be addressed at any given moment is controlled, also in an XY manner, by the third and fourth sets of addressing means.

As already indicated, the electro-optic material used in the display of the present invention is preferably an electrophoretic medium, most desirably an encapsulated electrophoretic medium, as described in the aforementioned patents and published applications. The present invention requires no modification of the electrophoretic medium itself, so the preferred media will not be described in detail herein, the reader being referred to the aforementioned patents and published applications which describe the preferred electrophoretic media in detail. Other types of electro-optic materials could also be used. The electro-optic medium could, for example, be of the rotating bichromal object type as described, for example, in U.S. Pat. Nos. 5,777,782 and 5,760,761. The medium could also be any of the class of electrochromic and suspended particle displays. Other types of electro-optic materials, include, for example, liquid crystal, especially polymer-dispersed and/or reflective liquid crystal, and suspended rod-shaped particle devices; see Saxe, Information Display, April/May 1996(Society for Information Display), and U.S. Pat. No. 4,407,565.

Embodiments of the invention will now be described, though by way of illustration only, with reference to the accompanying drawings.

As already indicated, XYZ addressing can be accomplished when there is a separate method of addressing or affecting the cluster-level transistor structures, aside from the conventional XY array. One very simple example of such addressing is shown in FIG. 1 of the accompanying drawings. This Figure shows a first display of the present invention (generally designated 11) having row drivers X1, X2, X3 and column drivers Y1, Y2. Cluster structures 13 are provided connected to the row drivers X1, X2, X3, these cluster structures each having first and second states. When the cluster structures 13 are in their first state, they connect the row drivers X1, X2, X3 to the odd lines of the display, designated Z1, thus enabling addressing of pixels 15 located on these odd rows, and isolate the row drivers from the even lines of the display, designated Z2. On the other hand, when the cluster structures 13 are in their second state, they connect the row drivers X1, X2, X3 to the even lines Z2 of the display, thus enabling addressing of pixels 17 located on these even rows, and isolate the row drivers from the odd lines Z1 of the display 11. This logic occurs at the cluster structure (or in such a simple example, could also occur by simply by wiring X and Z together at the pixel structure and splitting the necessary threshold activation voltage in half between them). Thus, the display 11 achieves XYZ addressing that functions in an manner similar to interlacing.

Figure 2:
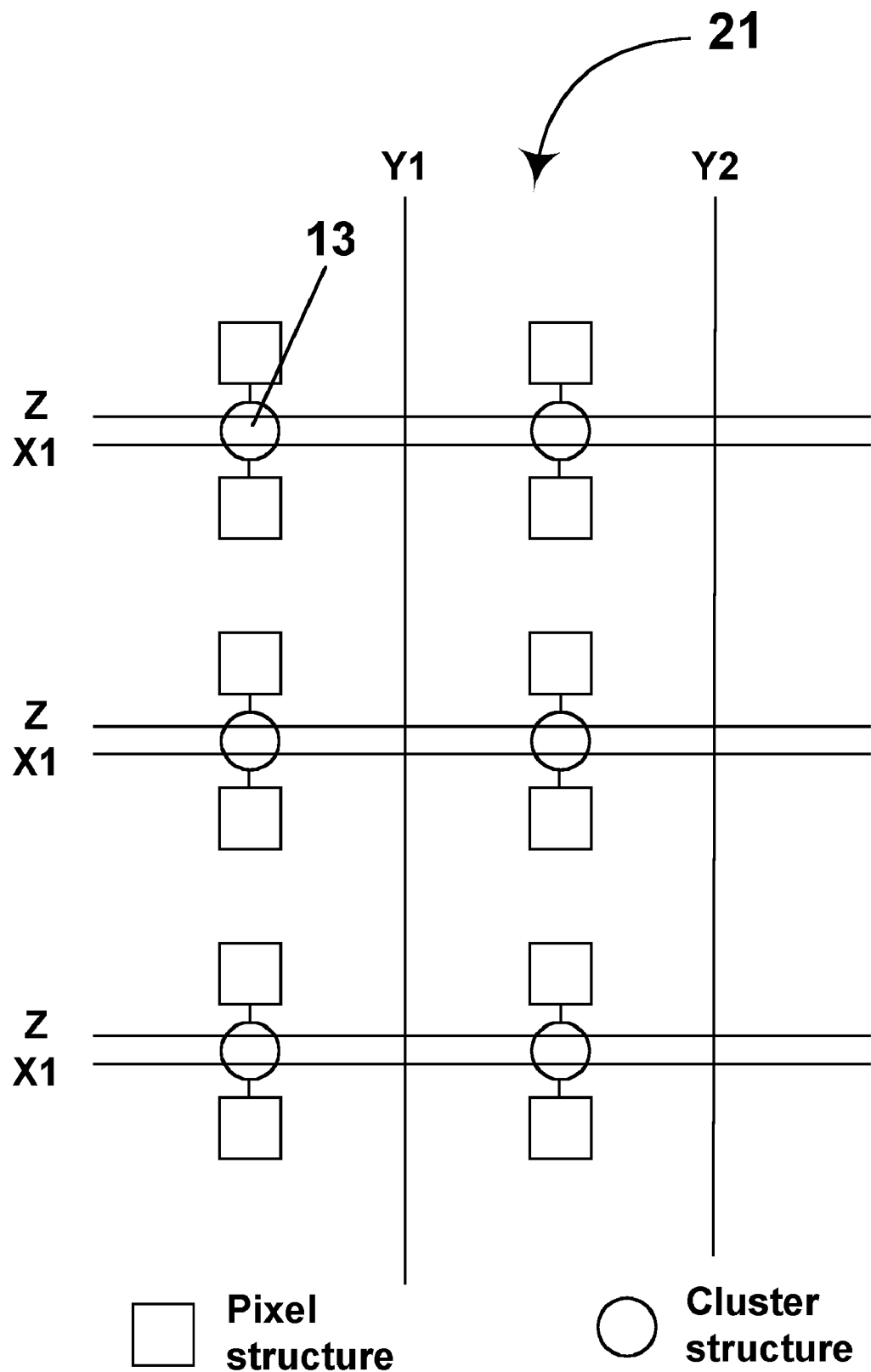

FIG. 2 illustrates a second display (generally designated 21) using a variation of the same approach. In this display 21, a single line Z connected to the clusters 13 can vary between two values, say 0 and 1. The cluster logic is such that when the Z value is 0, the input on row drivers X1, X2, X3 affects the pixels above (in FIG. 2) the clusters 13, but when the Z value is 1, the input on row drivers X1, X2, X3 affects the pixels below the clusters 13.

As already noted, the three-dimensional addressing method of the present invention is particularly useful with displays using photoconductors for addressing. It has previously been proposed to address electronic display media by means of light impinging upon a photoconductor; see, for example, Blazo, High Resolution Electrophoretic Display with Photoconductor Addressing, SID Digest, 1982, pages 92-93, and the aforementioned International Application Publication No. WO 99/47970 of E Ink Corporation. In one such addressing scheme (hereinafter for convenience called the "row light-emitter scheme"), the display comprises in sequence:

(a) a first transparent electrode, typically formed from indium tin oxide (ITO), which is patterned into columns;
(b) the display medium itself, which may be an electrophoretic display medium, preferably an encapsulated electrophoretic display medium;
(c) a photoconductor layer;
(d) a second, light-transmissive electrode in electrical contact with the photoconductor layer; and
(e) a light-emitting layer patterned into rows.

Whenever a row of the light-emitting layer is activated, the corresponding region of the photoconductor is able to conduct current and the columns of the first electrode can control the image of that row. This embodiment is appropriate when the light source (e.g. an electroluminescent (EL) light source) does not have a threshold. One drawback of this approach is that the light from each row must stay on for all or most of the time required for the display medium to image. If this takes k seconds, it may require up to k*y seconds to address y rows.

In a second such addressing scheme (hereinafter for convenience called the "pixelated light-emitter scheme"), the first electrode is not patterned, and the light-emitting layer is pixelated (i.e., patterned into a two-dimensional grid of individually controllable pixels) so that it can apply any desired image to the photoconductor layer. Where light is present, the photoconductor layer conducts current, the corresponding portions of the display medium experience an electric field and the display medium is imaged accordingly. Provided the display medium used is bistable, the light-emitting layer may then be switched off until the image needs to be changed. This addressing scheme is especially useful when the light source (e.g. organic light-emitting diodes (OLED's)) has a threshold and may be passively addressed. An advantage of this approach is that the light pattern is applied across all rows simultaneously and only k seconds are required to address y rows. A disadvantage is that only certain light-emitting materials may be easily multiplexed.

As already noted, both addressing schemes require numerous drivers, for example 2400 drivers for a full color 640×480 display, and in small displays especially the cost of the drivers rivals or may outweigh the cost of the electro-optic material. The present invention enables the number of such drivers to be greatly reduced by forming separately addressable regions or sub-arrays. Such separately addressable regions may be formed in several ways.

Figure 3:
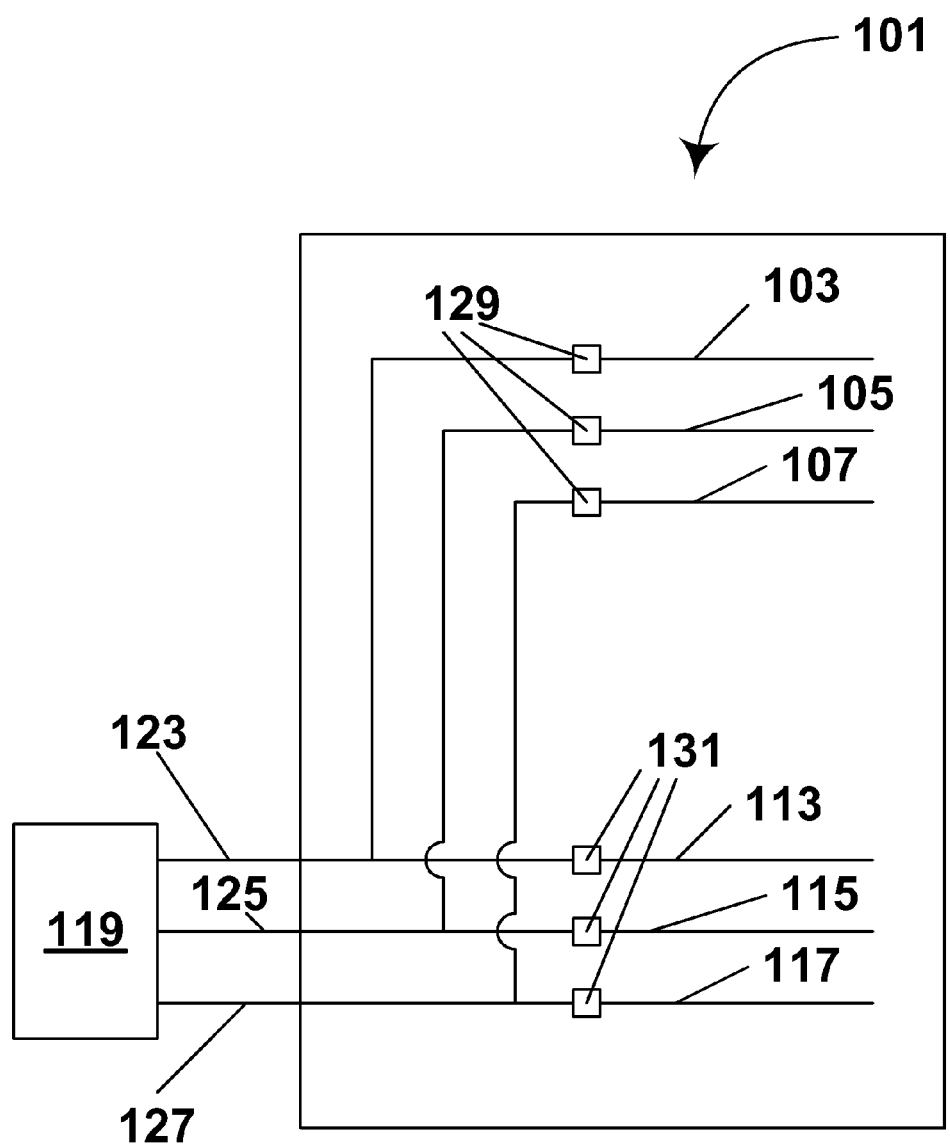

FIG. 3 illustrates one way of forming such separately addressable regions. This Figure shows a third display of the present invention (generally designated 101) having a first region comprising rows 103, 105 and 107 and a second region comprising rows 113, 115 and 117. Each row is connected to a driver 119, the rows 103 and 113 being connected via a driver line 123, the rows 105 and 115 by a driver line 125, and the rows 107 and 117 by a driver line 127. Each row is provided with a logic element 129 or 131, such as a transistor, that governs whether voltage reaches the light-emitting region of a row. As shown in FIG. 3, several rows in different regions may be wired to a common driver line, yet only a combination of voltage across a row and voltage to the associated transistor will result in light emission from any given row.

Figure 4:
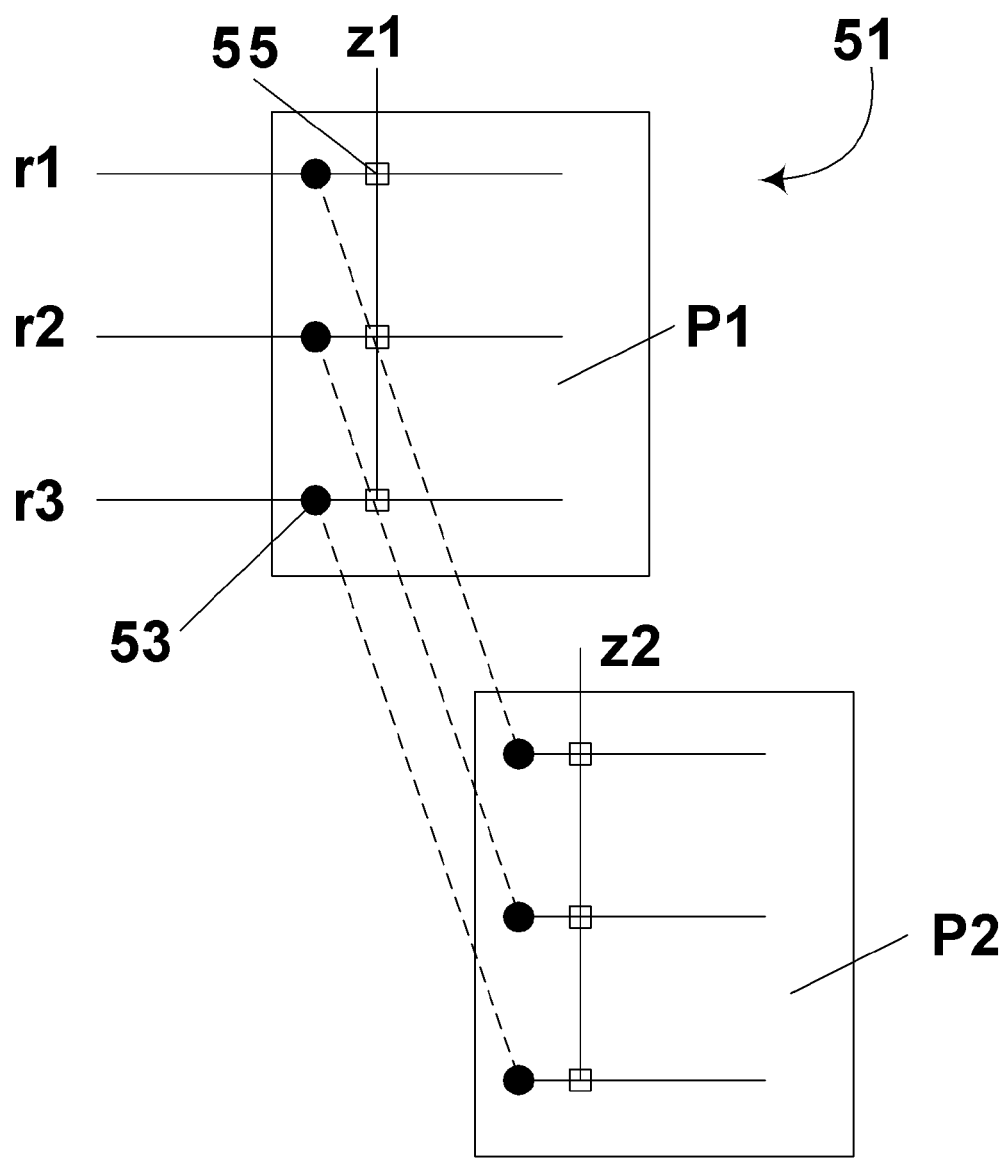
FIG. 4 is a schematic circuit diagram of a fourth three-dimensionally addressed display of the present invention having the form of a multi-page electronic book.

Also, as already indicated, the separately addressable regions may be separate sheets of the display medium, as illustrated in FIG. 4. This Figure shows a fourth display (generally designated 51) of the invention having the form of a multi-page electronic book; although only two pages P1 and P2 are shown in FIG. 4, more pages would normally be present. Each page is provided with a set of row electrodes r1, r2, r3 under the control of row drivers (not shown). The row electrodes r1, r2, r3 on the various pages are connected the rows in parallel, each row electrode passing through a conductive pad 53, which extends through the pages of the display medium as a via. When the individual pages are placed adjacent and in approximate registration with each other (much like a bound book) the vias extend from the top page to the bottom page in electrical connection. Any suitable means of providing this connection may be employed, such as anisotropic tapes, zebra strips, conductive glues, and the like. Any suitable means of via formation (whether at the step where each sheet is constructed or afterwards to create a via through all sheets) may be employed. The pages P1, P2 are provided with column electrodes under the control of column drivers, both the column electrodes and the column drivers being omitted from FIG. 4 for ease of illustration. The column electrodes on the various pages are also connected in parallel by vias in the same way as the row electrodes. The third set of addressing means in the display 51 comprises a set of transistors 55, one of which is provided in each row electrode r1, r2, r3 in each page of the display. The transistors 55 are controlled by control lines z1, z2, all of the transistors on any one page being on or off simultaneously.

The display 51 operates in the following manner. One row electrode (say r1) is selected in the usual manner, and because of the presence of the vias 53 this selects r1 on each page P1, P2. However, the transistors 55 on only one of the pages P1, P2 are turned on, so that the portion of the row electrode r1 adjacent the electrophoretic medium (not shown) is selected on only one page. Accordingly, when appropriate voltages are placed on the column electrodes, only the selected row on the selected page is addressed.

Figure 5A:
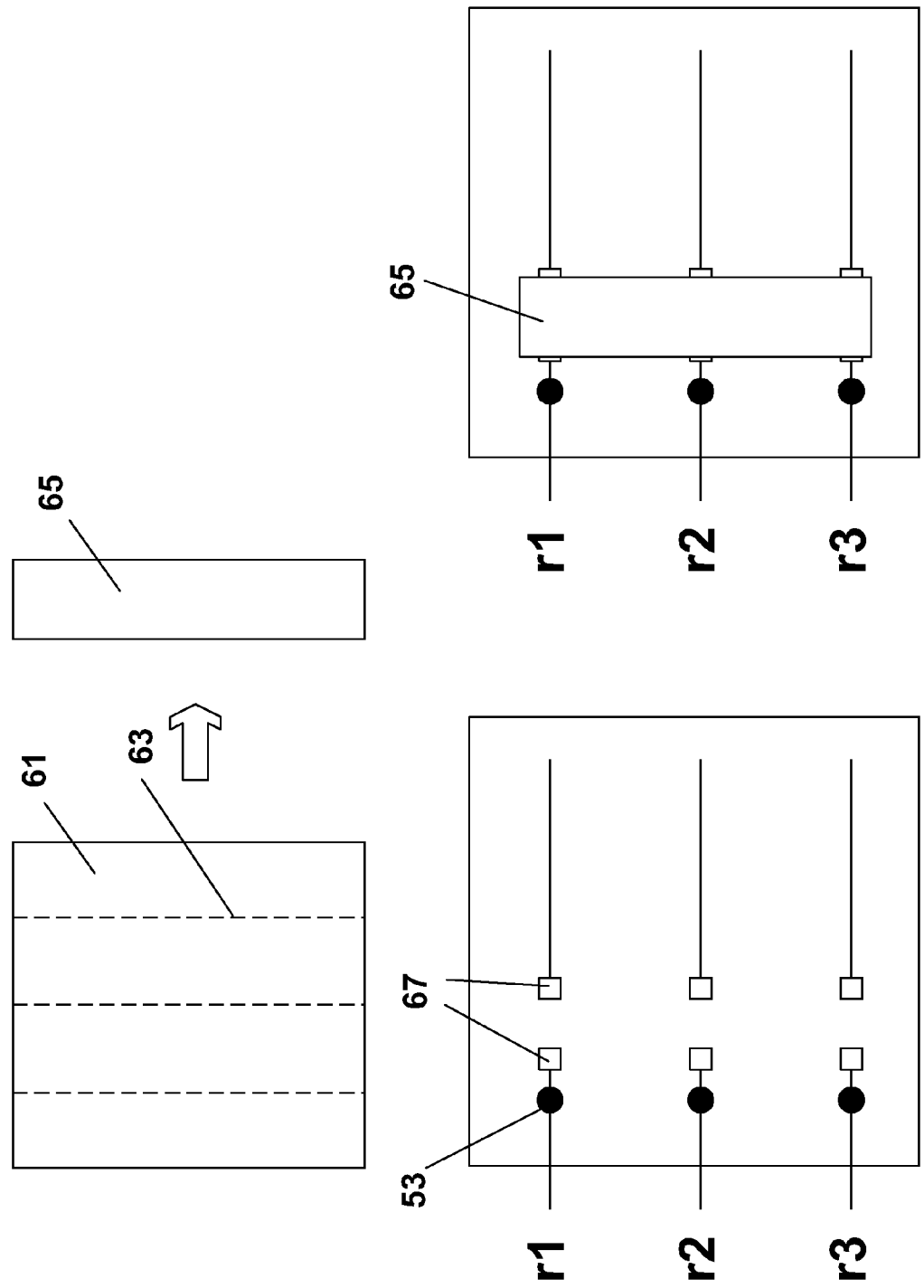
FIGS. 5A and 5B illustrate one method of providing addressing means in the type of display shown in FIG. 4 and in a similar display.

FIG. 5A illustrates a convenient method of forming the transistors 55 used in FIG. 4, or any other display using similar transistor arrays. One benefit of the display 51 shown in FIG. 4 is that the transistors are all present in narrow strips on each page. Accordingly, as shown in FIG. 5A, the necessary transistors may be formed by any conventional process on a sheet 61, which is then cut, as indicated by the broken lines 63, to form multiple transistor strips 65. The individual pages of the display 51 are prepared in the form shown in FIG. 5A with the individual row electrodes broken where the transistors 55 are to be inserted, and the adjacent ends terminated in conductive pads 67. The transistor strip 65 is than secured in position on the page to form the completed structure shown in FIG. 4.

The strip 65 need not be formed on a flexible substrate. For example, a thin, inflexible strip placed in a column orientation as shown in FIG. 5A would not interfere with the flexibility of the visible portion of the display medium, since the strip 65 can be placed in a region corresponding to the spine and binding of a conventional book. The transistors in the strip 65 could also be combined with on-board drive logic, such as shift registers. In this way, each transistor could be separately addressed, either eliminating the need for row drivers or reducing the number of drive lines required.

The transistors 55 shown in FIG. 4 need not be formed by the process of FIG. 5A; the transistors may be placed onto the sheets of medium by any suitable means. For flexible media, thin film transistors (TFT's) on a flexible substrate (whether amorphous silicon or polycrystalline silicon) and including methods like flexible integrated circuits, organic TFT's, and the method of International Application Publication No. WO 96/41372 are all suitable. Alternatively, transistor formation could be performed directly on the sheet substrate.

Figure 5B:
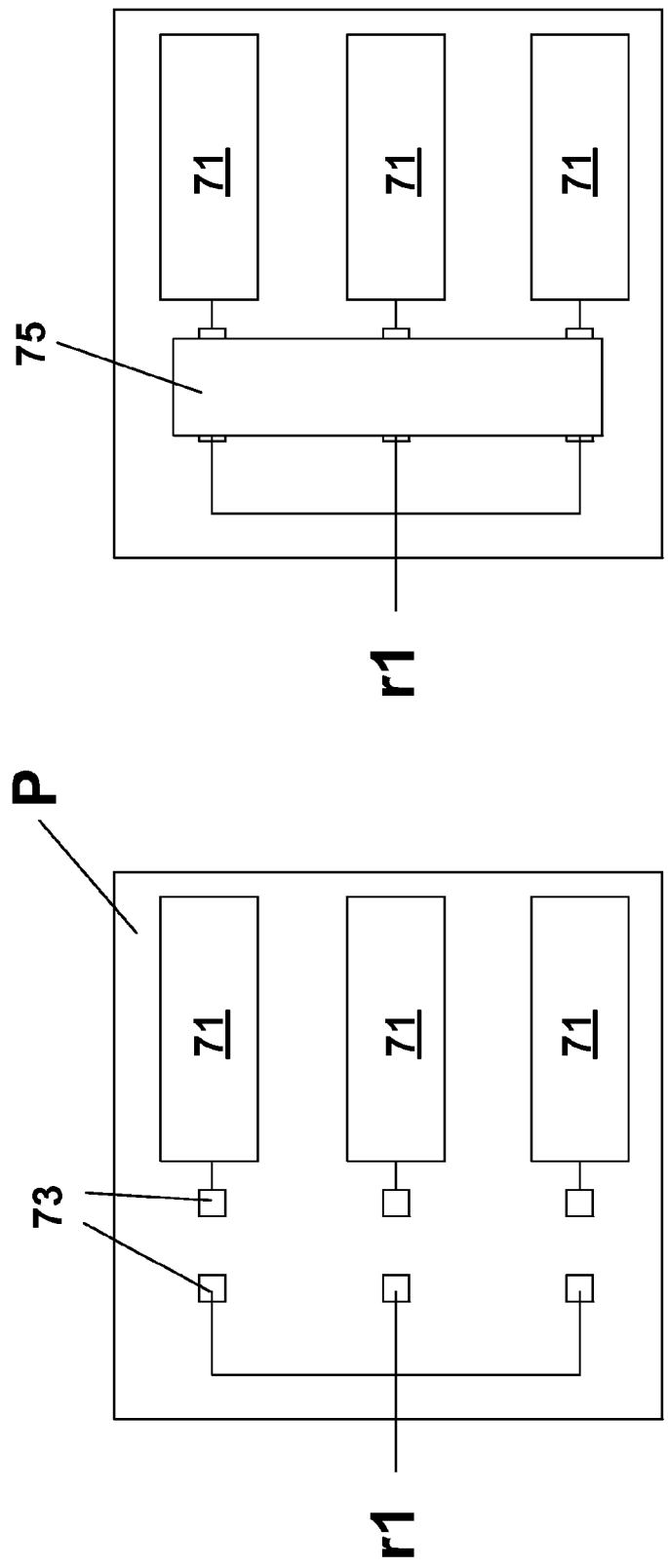

FIG. 5B shows a variation of the method of FIG. 5A which may be useful in forming the photoconductor-containing displays discussed below. As shown in FIG. 5B, on a page P, which will eventually form part of a multi-page display, a single row electrode r1 is connected to a plurality of electroluminescent strips 71; only three strips 71 are shown, but more would of course normally be used. The connections between row electrode r1 and strips 71 are broken where transistors are to be inserted, the ends adjacent the break being terminated by conductive pads 73. To produce the finished page P, a transistor strip 75, formed in the same manner as in FIG. 5A, is secured across the breaks in the connections. Note that unlike the transistor strip 63 shown in FIG. 5A, in which all the transistors switch off or on simultaneously, the strip 75 requires that its transistors be individually controllable, so that a single strip 71 can be selected for operation.

As already indicated, the display of the present invention may have the form of a multi-page electronic book. Before discussing additional forms of such multi-page electronic books of the invention, it is considered desirable to provide a more general discussion of the utility of such books, and the problems associated with such books.

In the prior art, the concept of an electronic book (such as the omni book concept invented by Alan Kay now of Apple Computer) typically connotes a device with a single electronically addressable display in which pages of text are displayed sequentially in time as a function of some input. Further, in EPO 618 715 A, an electronic notebook having three pages of addressable liquid crystal displays is disclosed. On the other hand real paper books contain multiple pages which may be accessed by means of a natural haptic input. Such pages however, once printed, are not changeable.

As already indicated, a display of the present invention may be in the form of an electronic book with multiple electronically addressable displays. Such an electronic book embodies the representation of information on a multiplicity of physical pages which may be electronically addressed or "typeset" such that the contents of said pages may be changed by means of an electronic signal and which may further be handled, physically moved and written on. The advantages of such a book of the present invention include the ability, from within a single electronic book, to access a large realm of information, which would normally encompass many volumes of standard paper books while still maintaining the highly preferred natural haptic and visual interface of said normal paper books. As such, an electronic book with multiple electronically addressable page displays, as disclosed herein, constitutes a highly useful means of information interaction.

Thus, this invention provides an electronic book with multiple electronically addressable page displays. In one embodiment such page displays may be thin, low cost and formed on paper or paper like substrates. Such substrates may be real paper, ultra thin glass, plastic, polymer, elastomer or other suitable material which embody some or a majority of paper like qualities including thinness, structure, manipulability or other characteristics normally associated with paper in its role as a haptically and visually interactable display of information. Said page displays additionally comprise address lines and electronically addressable contrast media which may be bistable media such that texts or images written to said page displays may be maintained without the application of power. Said page displays may further comprise page strobe or page address logic for the purpose of electrically addressing a particular page in said multiple page display book.

Said book may additionally contain electronic memory, an internal power source, controls and interfaces, which may either be wired, wireless or optical, for interfacing to various sources of data or communications. Such an electronic memory may contain the informational content, both textual and graphical, comprised in a multiplicity of normal paper books. A user may then select a book of choice and cause, by means of a control, the electronically addressable pages of said book to be "typeset" such that after some time delay the pages of said electronic book display the desired contents.

The invention provides for means of manufacturing the pages of said electronic book in a low cost way on a paper or paper like substrate. The invention further provides for means of binding such pages and addressing such a multiple page electronic book. Additional features including an interface and the ability to write in a reversible manner and have such writing recorded are also described. Further features and aspects will become apparent from the following description.

Figures 6A, 6B:
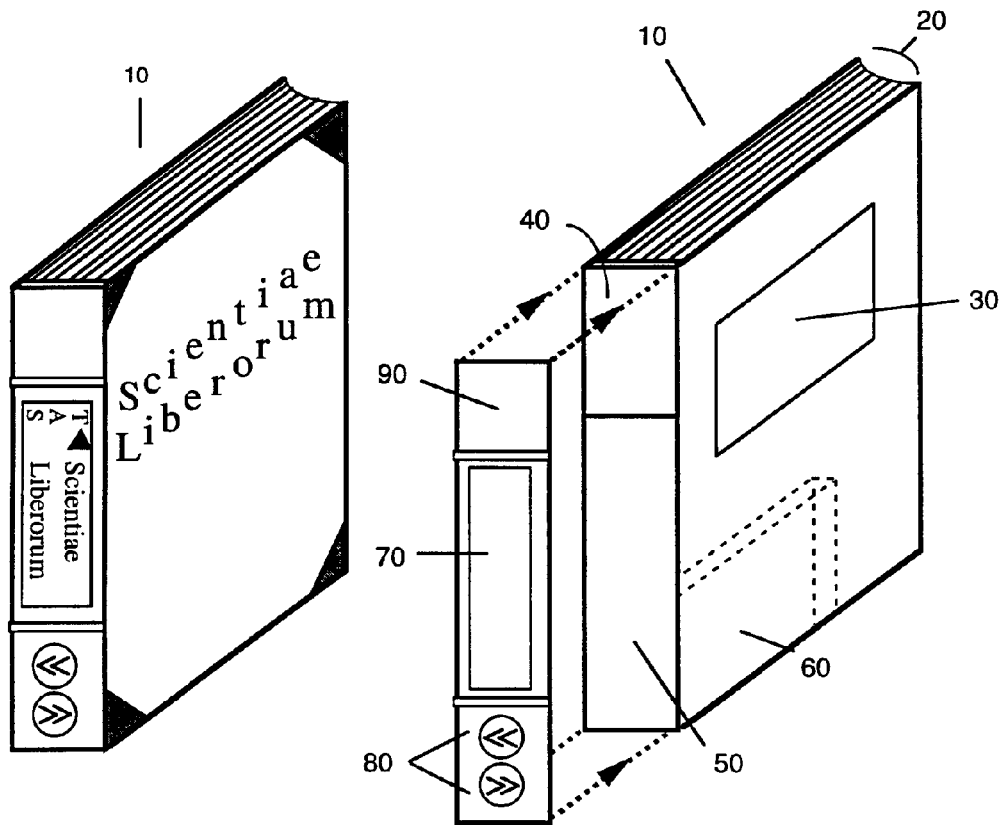
FIGS. 6A and 6B are partially perspective and partially schematic views of an electronic book with multiple electronically addressable pages.

Referring to FIGS. 6A and 6B, a book 10 is composed of multiple electronically addressable page displays forming a multiple page display ensemble 20 in which each page of said ensemble may be individually electronically addressed. Said book may additionally contain:

An internal power source 40 such as a battery;
Electronic display drivers 50 to write information to said page displays where said drivers may write information contained in a memory or alternatively may write information obtained via a suitable interface or alternatively may write information from another source such as an electronic pen or stylus or from another suitable source;
Memory 60 which may be a solid state memory such as flash memory or bubble memory or may be another form of memory such an optical disk or magnetic media or may be any other form of memory. Such memory may contain information including text and/or graphics. Such information may be for instance the text and graphics of a selection of books or journals. Further said memory may be programmable or re-programmable. Alternatively said memory may be permanent. Said memory may also be removable for the purposes of re-programming or for other purposes. Alternatively said memory may be a fixed memory. Said memory may also be interfaced to said electronic drivers and may further be interfaced to an external source;
A fast display 70 which may be an LCD display for displaying a certain subset of the information contained in said memory such as book titles;
Control buttons 80 which may be used for accessing the information contained in said memory and causing said information to be displayed on said fast display or on said page displays or to access some other control function;
A title space 30 which may be composed of a similar electronically addressable structure to said page displays;
Additional electronic elements 90 which may include a receiver or transmitter or other means of communications such as a data port or a modem or any other suitable interface. Said additional components may additionally contain a processor or microprocessor and any other components known in the art of computers or portable computers or any other electronic components useful in the operation of said electronic book.

Figure 7A:
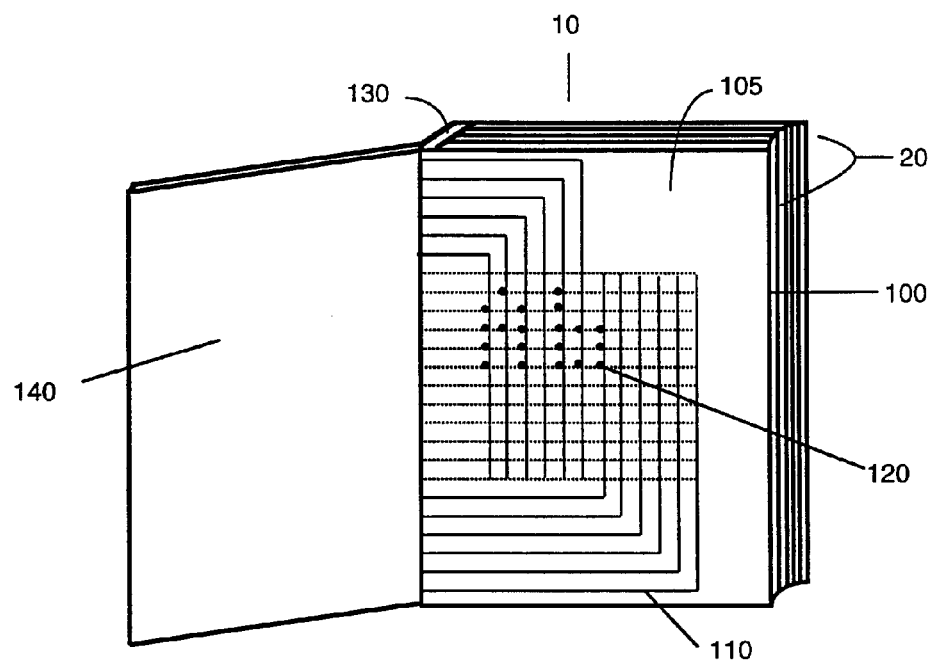
FIG. 7A is a partially perspective and partially schematic view of an electronic book with multiple electronically addressable pages open to a single such page

Referring to FIG. 7A said book 10 contains electronically addressable page displays 100 which combine to form an ensemble of multiple page displays 20. Said book may additionally comprise a cover 140 and spine 130 which may hold various elements as described in reference to FIGS. 6A and 6B. Such page displays 100 are composed of a substrate 105, an electronically addressable contrast media 120, and address lines 110. Said book 10 and said page displays 100 are configured such that substantially different information can be written or electronically "typeset" on the different page displays 100 which comprise the multiple page ensemble 20.

In a preferred embodiment said page displays may be thin, low cost and formed on paper or paper like substrates. Such substrates may be real paper, synthetic paper, ultra thin glass, plastic, polymer, elastomer, thin metal, carbon fiber or other suitable material which embody some or a majority of paper like qualities including thinness, structure, manipulability or other characteristics normally associated with paper in its role as a haptically and visually interactable display of information.

Said address lines may be composed of transparent conducting polymers, transparent conductors such as indium tin oxide, thin metal conductors or other suitable conductors. Such address lines may be applied by vacuum deposition, sputtering, photolithography or may be printed via ink jet systems or laser printer systems or may be applied via other appropriate means. Further such address lines may additionally be insulated with an appropriate insulator such as a non conducting polymer or other suitable insulator. Alternatively insulating layers may be applied in such manner to effect electrical isolation between row and row conducting lines, between row and column address lines, between column and column address lines or for other purposes of electrical isolation.

Said contrast media may be electrochromic material, rotatable microencapsulated microspheres, polymer dispersed liquid crystals (PDLC's), polymer stabilized liquid crystals, surface stabilized liquid crystal, smectic liquid crystal, ferroelectric material, electroluminescent material or any other of a very large number of contrast media known in the prior art. Certain such contrast media, such as microencapsulated media, may be printed via an ink jet or ink jet like system or may be applied via any other appropriate means.

Figure 7B:
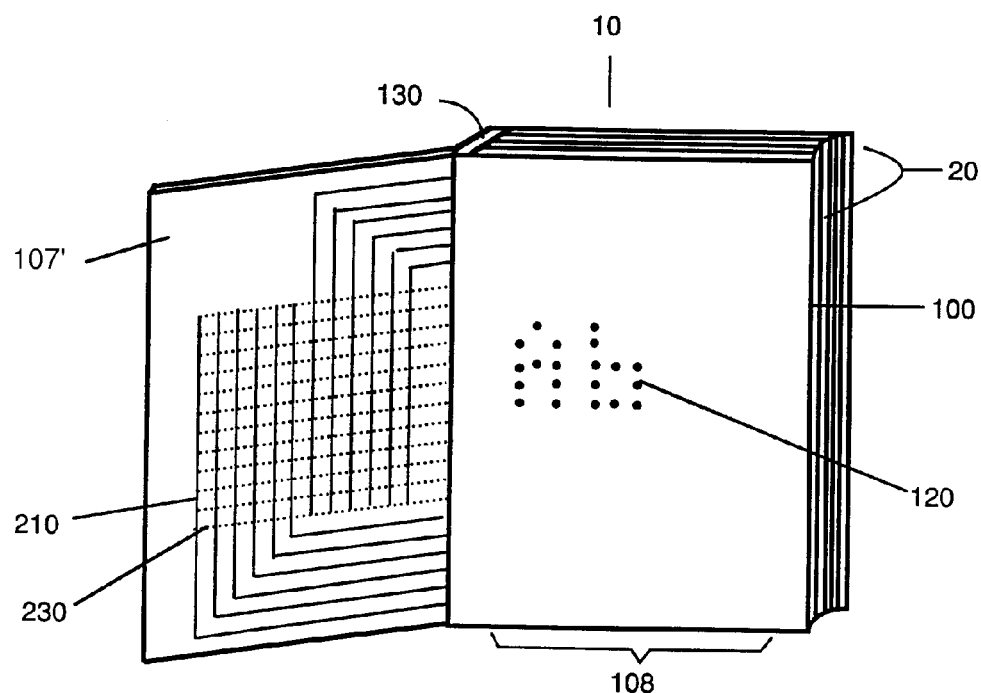
FIG. 7B is a partially perspective and partially schematic view of an electronic book configured with column and row address electrodes on a preceding page and a ground plane on a following page.

FIG. 7B is an electronic book configured with row 230 and column 210 electrodes on the back of a preceding page 107' and a ground plane 108 embedded in a following page 100.

Such an arrangement allows for addressing of said electronic page displays when said electronic book is in the closed state while allowing said page displays to be viewed without having to look through a top a electrode when said book is in the open condition. The operation of such addressing is effected by either cancelling or adding to the electric field produced by address lines of the complimentary orthogonality.

Figure 8:
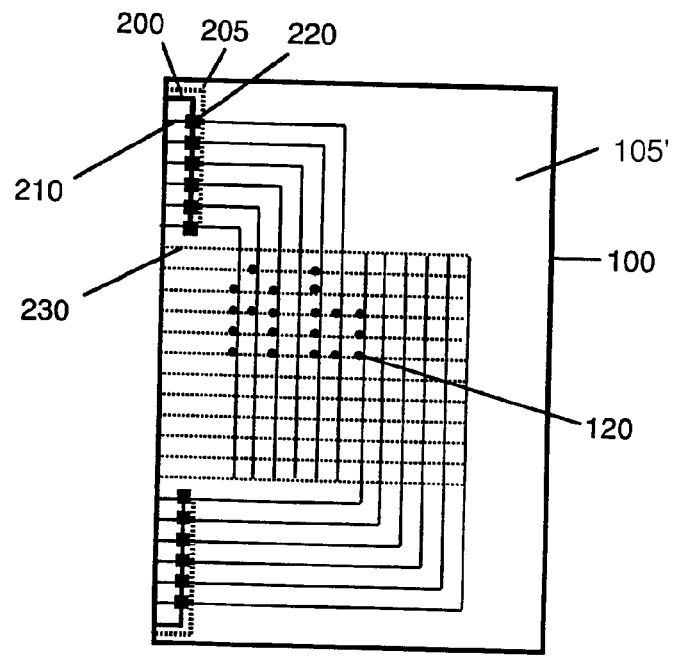
FIG. 8 is a schematic view of an electronically addressable page configured for simplified address line layout and partial page addressability with column strobe.

FIG. 8 depicts a preferred embodiment of a page display 100 incorporating a simplified address line scheme configured for partial page addressability. A substrate 105 has deposited on or embedded in it an underlying array of row address lines 230, an electronically addressable contrast medium 120 and an array of column address lines 210. A book configuration requires that all address lines are substantially accessible along or near a single edge of the book page. Such is the case with the schemes described herein. In the preferred embodiment row lines 230 and column lines 210 are common to each page in the multiple page ensemble. Pages are addressed individually via a page address strobe comprised of page address strobe control lines 200 and 205 and page address strobe switches 220 which control whether or not a particular page's column address lines are active in response to signal applied to said page address strobe control lines. It is understood however that in each of the embodiments described page strobing may be obviated in exchange for a more complicated spine driver in which each page in the multiple page ensemble may be wired directly and separately to the display driver.

Figure 9:
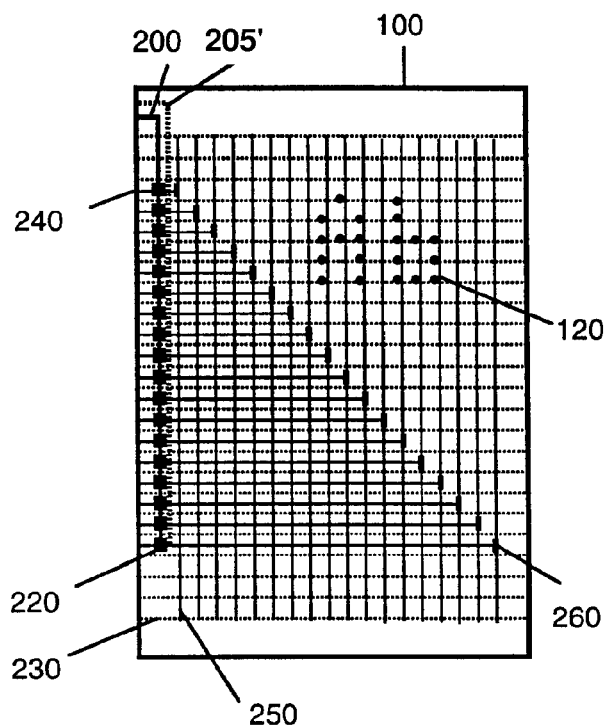
FIG. 9 is a schematic view of an electronically addressable page configured for multi-layer address line layout and full page addressability with column strobe.

FIG. 9 depicts a preferred embodiment of a page display 100 incorporating a multi-layer address line scheme configured for full page addressability. Edge column address line connectors 240 are connected to column address lines 250 via a conducting connection 260. Such a connection may be of conducting polymer, ITO, metal or other suitable conductor or may be a direct connection of the line 240 to 250 which may further be bonded with a laser weld or non conducting or conducting epoxy or other adhesive. In all other areas where column address line connectors 240 cross column address lines 250 there is no conducting connection as effected by the placement of a suitable insulating layer. The page strobe composed of page strobe control lines 200 and 205 and page strobe switches 220 operate as in FIG. 8 to control the state of said column address lines. As before column and row address lines may be common to each page in the multiple page ensemble.

Figure 10A:
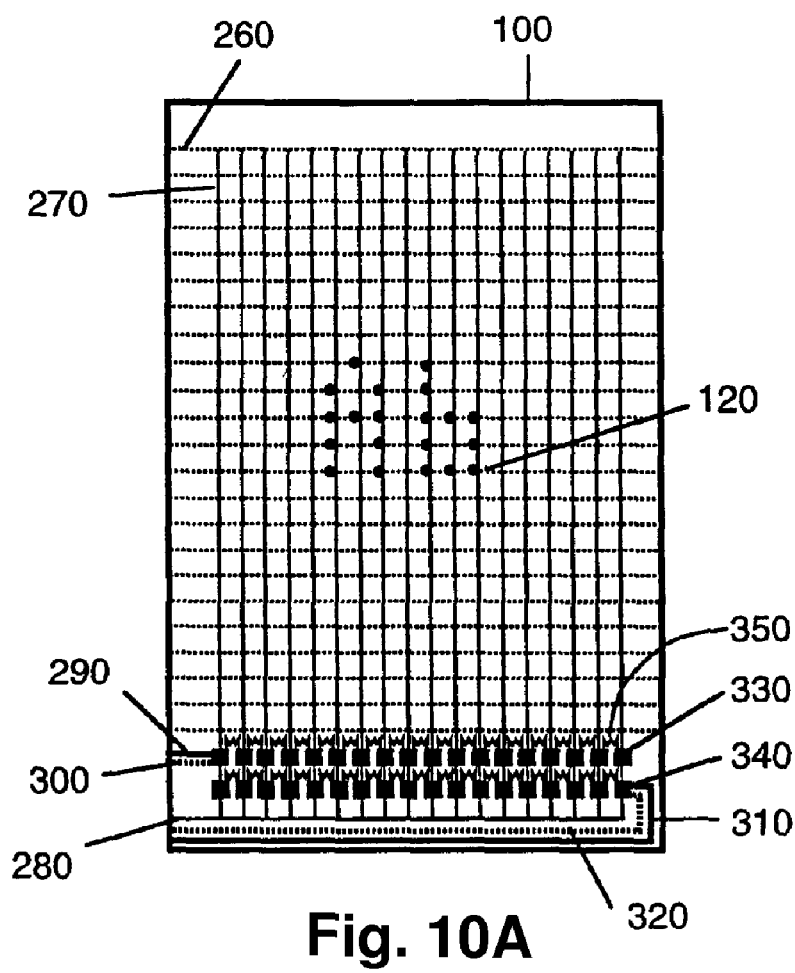
FIG. 10A is a schematic view of an electronically addressable page configured for row addressing with analog selected column lines.
Figure 10B:
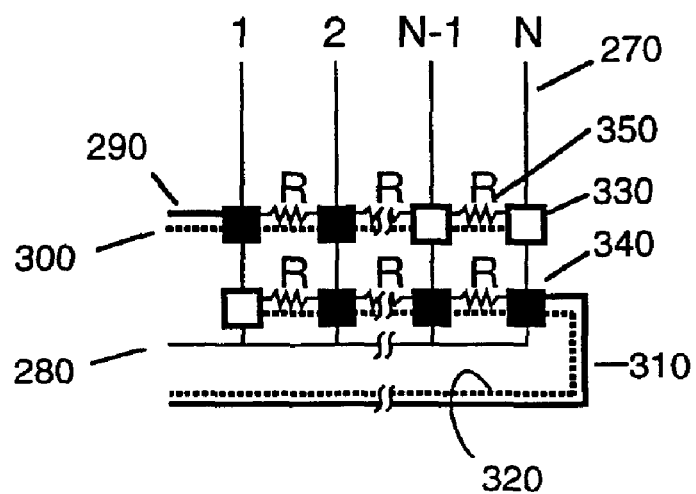
FIG. 10B is a schematic detail of the analog column select scheme.

FIGS. 10A-10B are schematic views of an electronically addressable page 100 in which row lines 260 emanate from the page edge and are connected to the display driver. Row lines may be common to each page. Column address lines are analog selected by means of applying appropriate voltages between analog column switch control line 290 and 300 and 310 and 320.

Referring to the detail, the analog column select scheme operates as follows: Each column address line 270 may be denoted by a number j between 1 and N where N is the total number of column address lines per page. Each column address line in turn is controlled via a set of two column switches, 330 and 340, each of which in turn may be given designations k and 1 for the top and bottom control switches (330 and 340) respectively where k and 1 both range from 1 to N.

Said column switches 330 and 340 have a uniform threshold in which the column address lines 270 which they control become active (closed circuit, denoted by a black filled box) if said column switch's control lines 290 and 300 and 310 and 320 respectively have a potential difference greater than a threshold voltage $V_{th}$ as measured at said switch control line input. Resistors 350 connect said switches 330 or 340 such that for a given applied potential difference on said switch control lines each switch sees a different and monotonicly scaled potential difference at its control line input face. Consider the case in which switch control line 290 and 310 are held at voltage $V_1$ and $V_2$ respectively and switch control lines 300 and 320 are held at ground. The criterion for column address line j to be active and thus be at the potential $V_c$ applied to common column address line bias 280 is:

$$V_1/(j*R)>V_{th} \text{ and } V_2/(N-j)*R>V_{th}$$

Thus by choosing an appropriate value of $V_1$ and $V_2$ a single column address line may be selected. In the example shown in the detail black filled control switches denote a closed switch condition and white filled control switches denote an open switch condition. Column line 2 has been made active by the appropriate choice of $V_1$ and $V_2$ whereas all other column lines are inactive as for all other column lines at least one column control switch is in the open circuit state. It is understood that a further simplification may be made by making $V_2$=constant-$V_1$ such that only a single voltage line need be addressed. The analog column switch control line or lines are unique and not common to each page thereby allowing for page selectability.

Figure 11A:
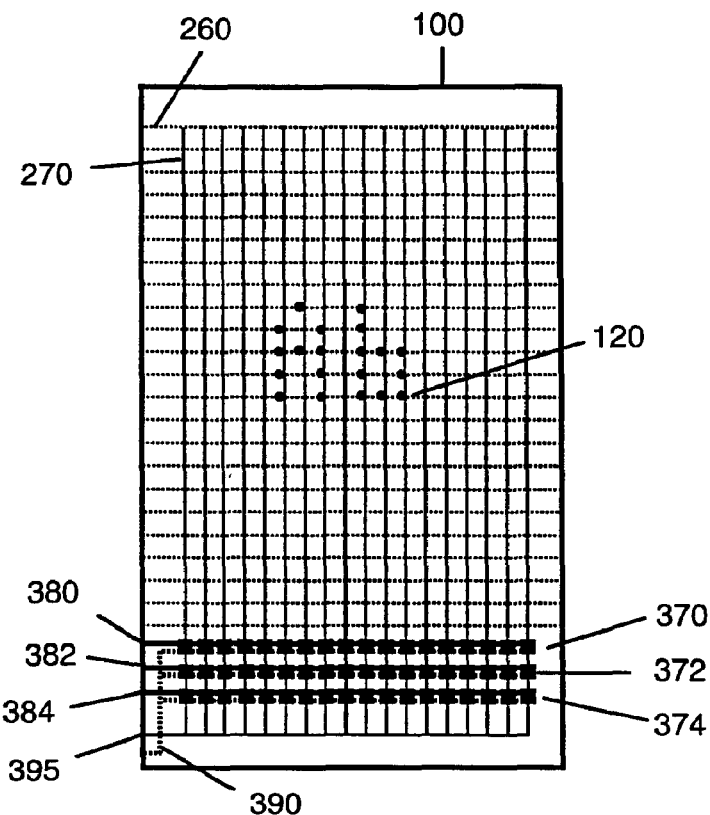
FIG. 11A is a schematic view of an electronically addressable page configured for row addressing with digital selected column lines.
Figure 11B:
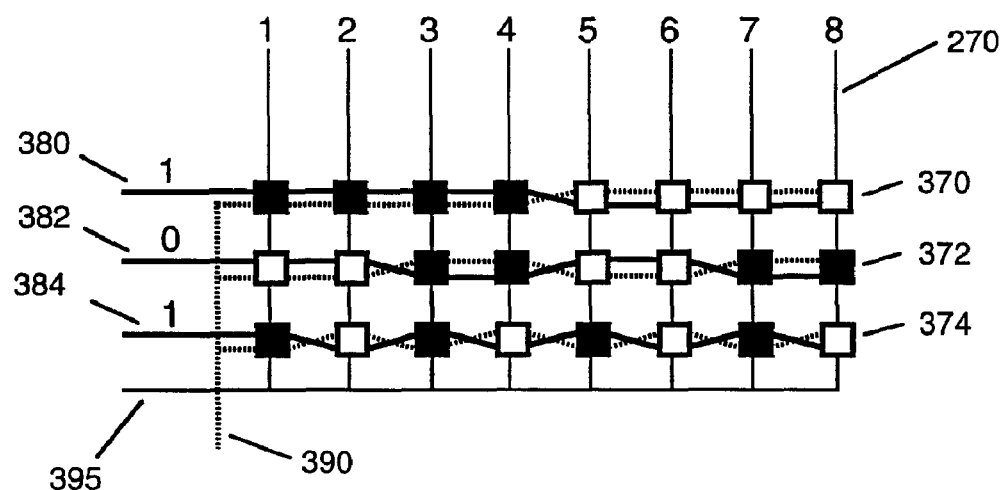
FIG. 11B is a schematic detail of the digital column select scheme.

FIGS. 11A-11B are schematic views of an electronically addressable page 100 in which row lines 260 emanate from the page edge and are connected to the display driver. Row lines may be common to each page. Column address lines are digital selected by means of applying appropriate logical values for digital column switch control lines 380, 382 and 384 with ground 390.

Referring to the detail, the digital column select scheme operates as follows: Rows of digital column switches 370, 372 and 374 control column address lines such that all such said column switches in a given column must be in a closed circuit state (black filled box) for said column address line to be active. In order to control N column address lines it is required to have S rows of column switches such that S is the least integer greater than Log[N]/Log[2]. In the example shown in the detail 3 rows of such column switches 370, 372 and 374 control 8 column address lines 270. The first such row is wired such that a logical 1 applied to the said row's column switch control line, 380, yields a state in which the first N/2 switches are in a closed circuit state and the second N/2 switches are in an open circuit state. The second row, 382, is wired such that said switch states alternate with a period of $N*2^{-2}$. The $n^{th}$ row alternates with a period of $N*2^{-m}$. Such a configuration allows for the unique selection of a single column address line such that said selected column address line becomes active with the potential applied to common column address bias 395. In the example shown in the detail column address line 3 becomes active upon application of the logical values 1, 0, 1 to column switch control lines 380, 382 and 384 respectively.

Figure 11C:
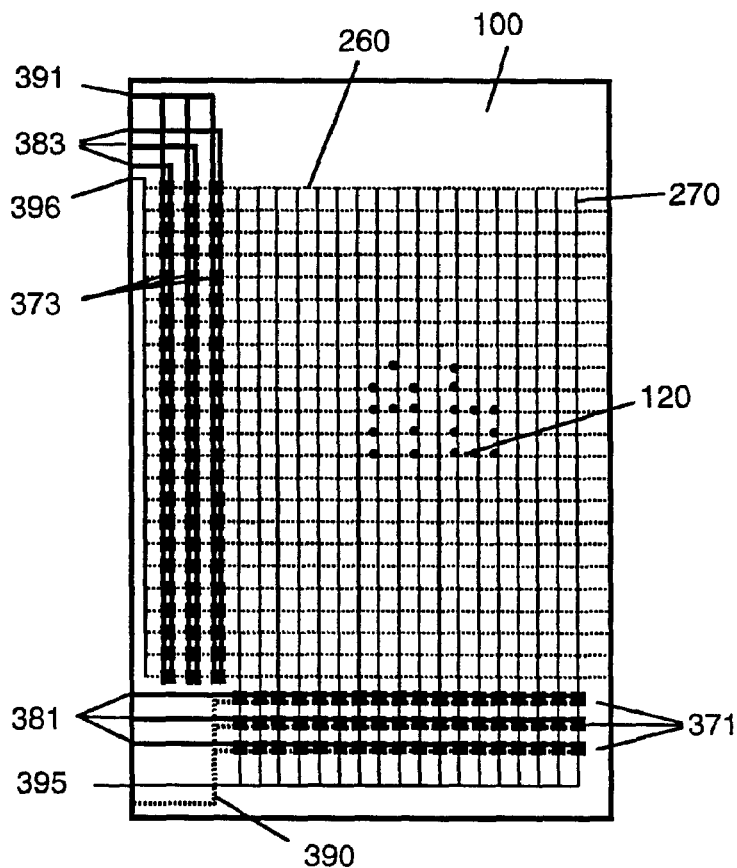
FIG. 11C is a schematic view of an electronically addressable page configured for digitally selected row lines and column lines.

Referring to FIG. 11C an electronically addressable page 100 may be constructed in which both column address lines and row address lines are digitally selected. Such a scheme minimizes the total number of address lines emanating from the page and may simplify connections to off board address logic. Such a scheme employs digital column switches 371, digital column switch control lines 381 with ground 390 and column address line common terminal 395 as in FIGS. 11A-11B as well as digital row switches 373, digital row switch control lines 383 with ground 391 and row address line common terminal 396. In this implementation the total number of leads required to emanate from the display page for the purpose of addressing are:

Log[Nc]/Log[2]+Log[Nr]/Log[2]+4 in which Nc is the number of column address lines and Nr is the number of row address lines. The additional 4 lead provide for switch grounds and common terminal lines. It is recognized that an even smaller number of emanating leads may be employed by further addressing said switch control lines with a further bank of control switches.

Finally it is also understood that any other suitable digital scheme in which each page has a page address may be employed as is known in the literature and prior art of display addressing.

Figure 11D:
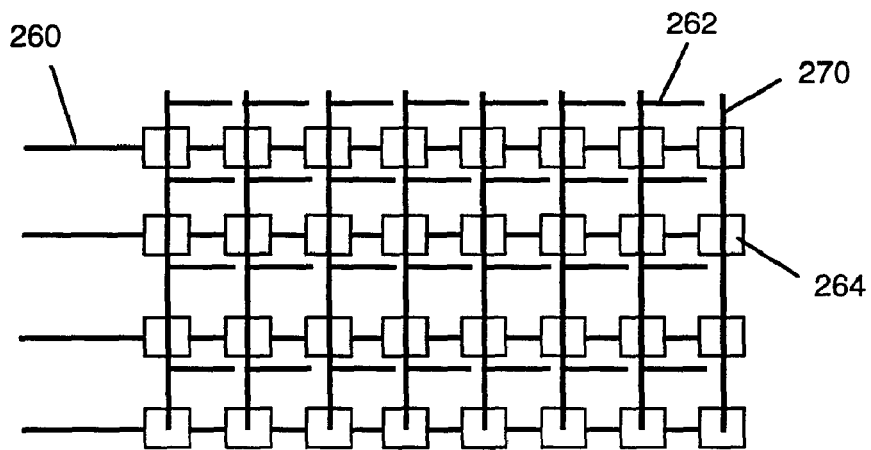
FIG. 11D is a schematic detail of an array of row and column addressing lines suitable for in-plane switched or dielectrophoretic switched electronically addressable contrast media.

Referring to FIG. 11D row electrodes 260 and column electrodes 270 may be configured to perform an in-plane switching function by means of insulating said lines from each other by the addition of an insulating pad 264 and by addition of an added address line section 262. Two such in-plane switching arrays, one lying on top of the other, are suitable for performing a dielectrophoretic switching function.

Referring to FIGS. 12A-12D a great many electronically addressable contrast media are known in the literature and prior art. In one embodiment a dielectric sphere 440 with substantially different contrast hemispheres may be microencapsulated in a microcapsule 420 and may be free to rotate in a fluid 430. The orientation of such a sphere may be controlled via the applied potential difference between electrode or address line 400 and 410. If one or both such electrodes are substantially transparent then an electronically addressable contrast may be effected. Such systems are known to possess inherent bistability or memory during open circuit due to electrostatic stiction.

In another system polymer dispersed liquid crystals (PDLC's) 450 may be microencapsulated or encapsulated in a microcapsule or capsule 420. In the absence of an applied bias between electrodes 400 and 410 said PDLC's are not oriented and are thus highly scattering and thus opaque. Under the application of a bias said PDLC's become aligned and are thus substantially transmitting. Thus, again, an electronically addressable contrast may be effected. Additionally such a contrast system may be a polymer stabilized system as is known in the prior art such that said system exhibits bistability.

In another system oriented LCD molecules 470 which may be microencapsulated in microcapsule 420 may be caused to rotationally orient and thus change the polarization of incident light upon application of a bias between 400 and 410. When viewed through a polarizer 460 said arrangement may again effect an electronically addressable contrast medium.

In another system an electrochromic material 480 and an electrolyte 490 which may be a solid electrolyte are sandwiched between electrodes 400 and 410. Application of a potential difference between said electrodes effects an electronically addressable change of contrast. Said electrochromic systems are known in the prior art to be capable of memory, threshold, color capabilities and operability with a solid electrolyte system.

Figure 12E:
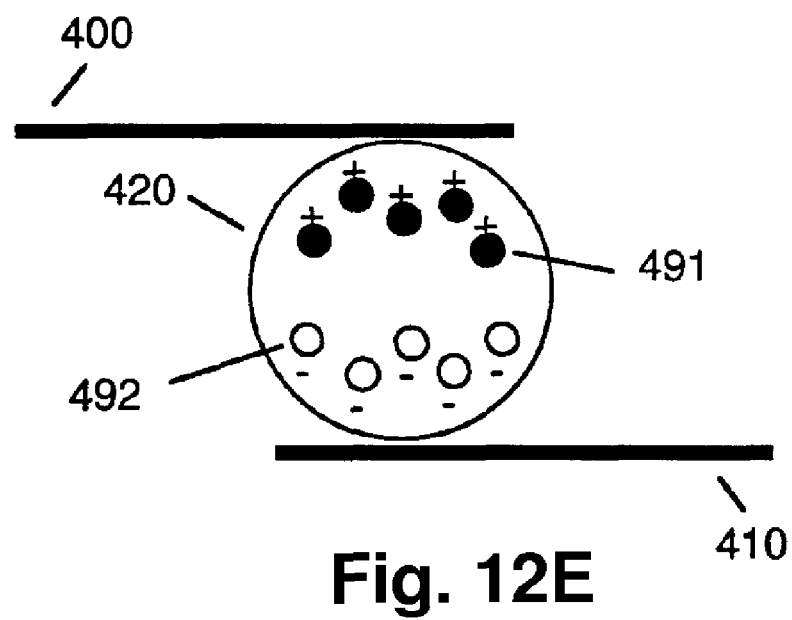
FIGS. 12E-12F are schematic details of a two part dye based electronically addressable contrast medium
Figure 12F:
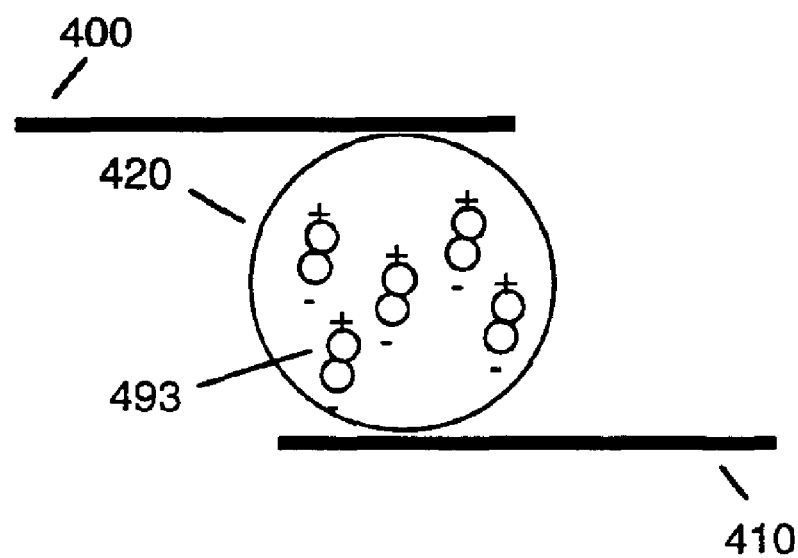
Figure 12G:
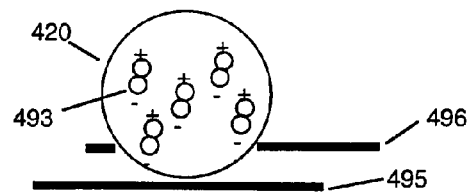
FIGS. 12G-12L are schematic details of in plane switched and near in-plane switched electronically addressable contrast media.
Figure 12H:
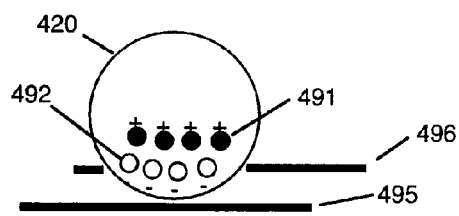
Figure 12I:
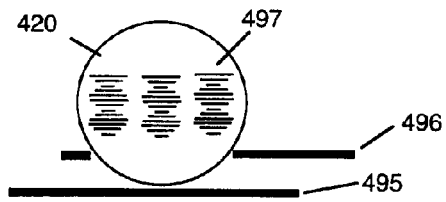
Figure 12J:
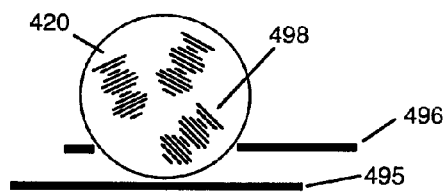
Figure 12K:
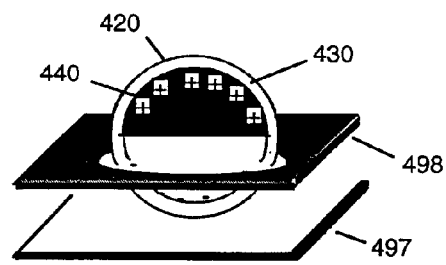
Figure 12L:
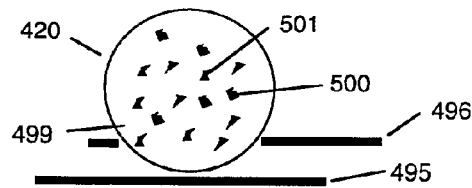

Referring to FIGS. 12E-12F, another system, described in the patent application Ser. No. 60/022,222 by Joseph M. Jacobson filed on Jul. 19, 1996, a dye material 491 which may have an associated positive charge or may be bound to a particle with a positive charge may be brought into proximity or separated from the pH altering or solvent substance 492 which may have a negative charge or be bound to a particle with a negative charge by means of an electric field applied to electrodes 400 and 410. Such a chemical system, which may be encapsulated in capsule 420, may constitute a field effect electronically addressable contrast media in such case as the color of said dye material is altered by said pH altering or solvent substance.

Referring to FIGS. 12G-12L, it may be desirable to avoid the use of a top transparent electrode 400 as such electrodes may degrade the optical characteristics of the display. This may be accomplished in a reflective display by employing in-plane switching. In-plane switching techniques have been employed in transmissive LCD displays for another purpose, namely to increase viewing angle of such displays. In the patent application Ser. No. 60/022,222, several in-plane switching techniques may be employed to obviate the need for a top electrode. In one such system a dye material with an associated positive charge 491 and a pH or solvent substance with an associated negative charge 492 may be separated by means of an in-plane electric field effected by means of application of a potential to in-plane electrodes 495 and 496. Such a system is viewed from above and thus said electrodes may be opaque and do not effect the optical characteristics of said display.

In another such system a bistable liquid crystal system of the type demonstrated by Minolta is modified to be effected by in plane electrodes such that a liquid crystal mixture transforms from a first transparent planar structure 497 to a second scattering focal conic structure 498.

In another scheme, suitable for two color microspheres, a near in-plane switching arrangement may be realized in which a two color microsphere 440 is encapsulated in an outer capsule 420 which sits in a hole created by a middle electrode 498. Applying a bias between said middle electrode 498 and a bottom electrode 497 causes said sphere to rotate as a function of the polarity of said bias.

In another scheme a field effect electrochromic contrast media may be realized by means of a microcapsule 420 containing phosphor particles 500 and photoconductive semiconductor particles and dye indicator particles 501 in a suitable binder 499. Applying an AC field to electrodes 495 and 496 causes AC electroluminescence which causes free charge to be generated in the semi-conducting material further causing said dye indicator to change color state.

Referring to FIGS. 12M-12P an entirely different means may be employed to effect a rear address of said contrast media. In these schemes, disclosed in the patent application Ser. No. 60/022,222, the dielectrophoretic effect is employed in which a species of higher dielectric constant may be caused to move to a region of high electric field.

Figure 12M:
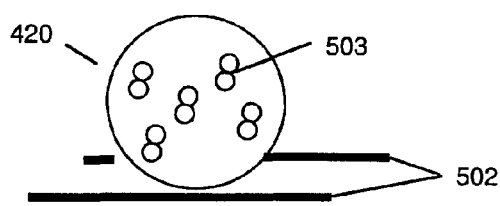
FIGS. 12M-12P are schematic details of dielectrophoretic switched electronically addressable contrast media.
Figure 12N:
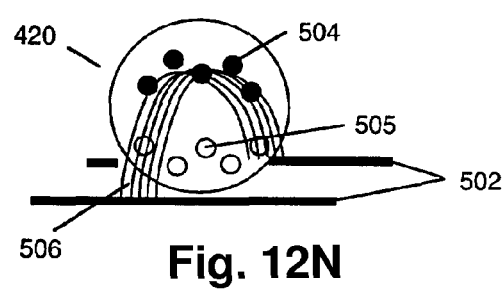
Figure 12O:
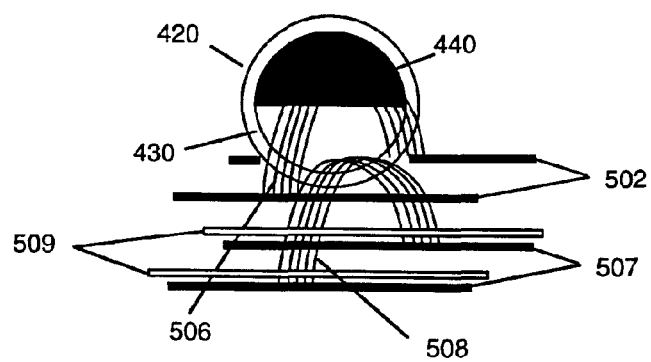
Figure 12P:
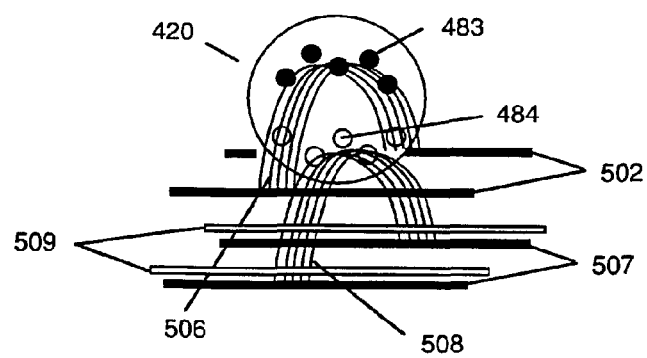
Figure 13A:
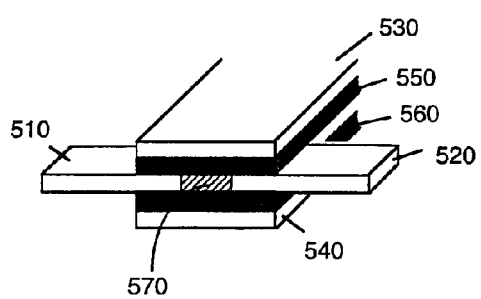
FIGS. 13A-13E are schematic details of various switch and relay assemblies.
Figure 13B:
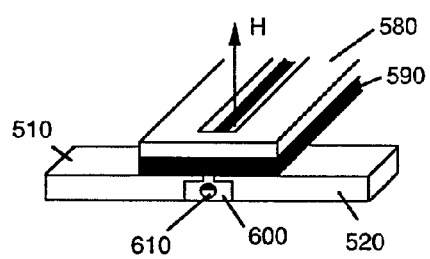
Figure 13C:
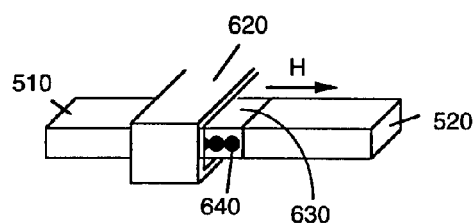
Figure 13D:
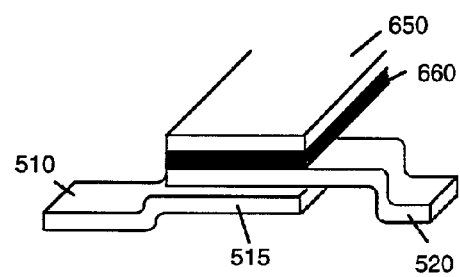
Figure 13E:
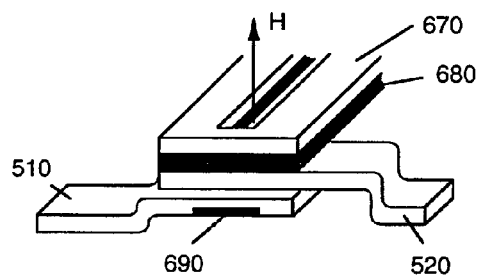
Figure 14A:
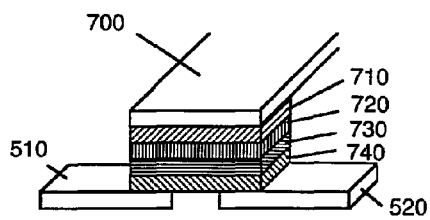
FIGS. 14A-14E are schematic details of various switch structures.
Figure 14B:
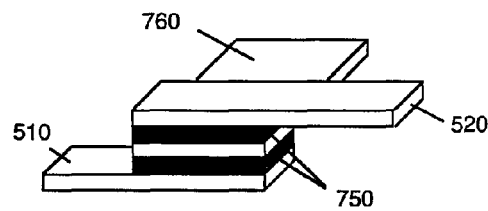
Figure 14C:
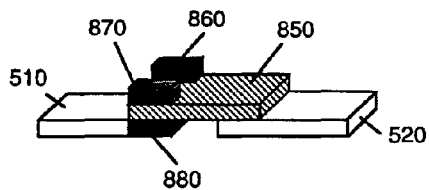
Figure 14D:
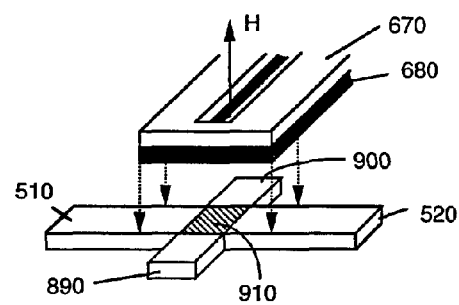
Figure 14E:
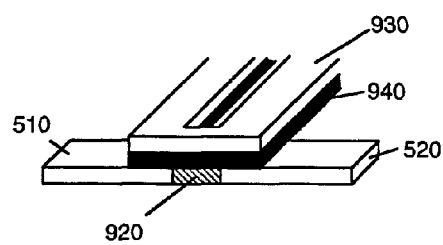
Figure 14F:
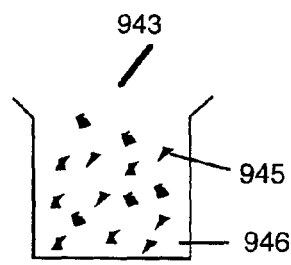
FIGS. 14F-14I are schematic details of various printed switch structures.
Figure 14G:
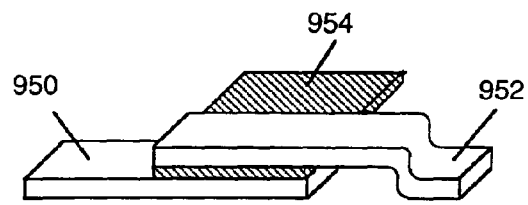
Figure 14H:
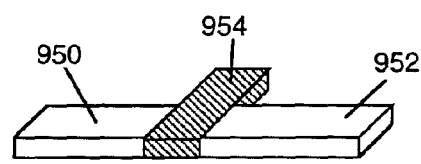
Figure 14I:
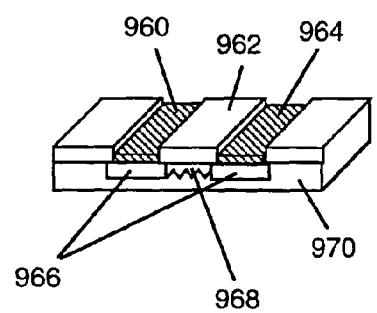
Figure 15A:
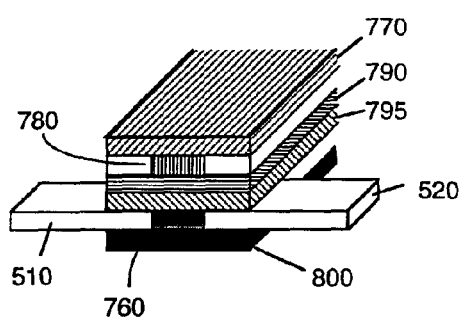
FIGS. 15A-15D are schematic details of various optically addressed and opto-electronic switch structures.
Figure 15B:
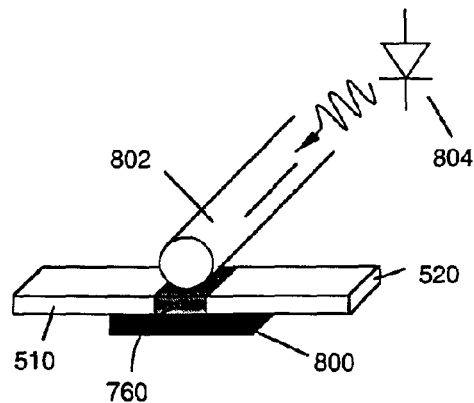
Figure 15C:
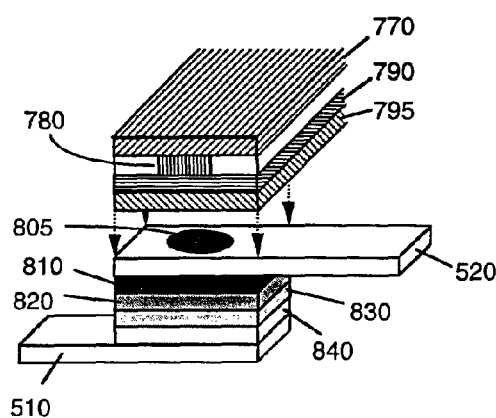
Figure 15D:
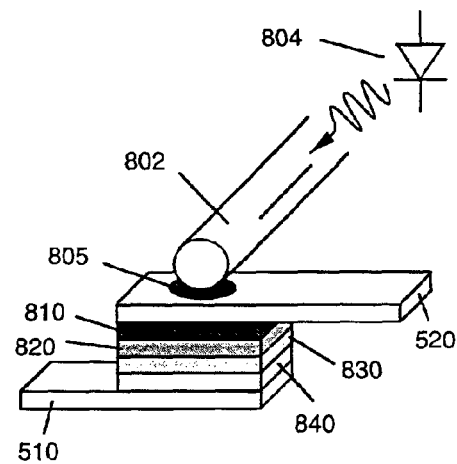

Referring to FIGS. 12M and 12N a non-colored dye solvent complex, 503, which is stable when no field is applied across electrode pair 502 may be caused to dissociate into colored dye 504 and solvent 505 components by means of an electric field 506 effected by a potential on electrode pair 502.

In another system stacked electrode pairs 502 and 507 may be employed to effect a high field region in a higher 506, or lower, 508 plane thus causing a higher dielectric constant material such as one hemisphere of a bichromal microsphere, 440 or one species 483 of a mixture of colored species, 483 and 484 to migrate to a higher or lower plane, respectively, and give the effect of differing color states. In such schemes materials 509 which may be dielectric materials or may be conducting materials may be employed to shape said electric fields.

It is understood that any other electronically addressable contrast medium may readily be substituted for those described above.

Referring to FIGS. 13A-13E means are described for implementing address line control switches. Referring to the left uppermost figure address input line 510 is separated from address output line 520 by means of space 570 which may contain a polarizable fluid, conducting beads or filings or other such substance such that when a bias is applied between switch control lines 530 and 540 setting up an electrostatic field through insulators 550 and 560 and space 570 such that a substantial decrease in resistivity is effected between lines 510 and 520.

In another system address input line 510 is separated from address output line 520 by means of spacer 600 which may contain magnetically poled microspheres 610 which have a substantially conducting hemisphere and a substantially insulating hemisphere. Application of a current to loop control line 580 effects a magnetic field as depicted which causes said microspheres to line up with said substantially conducting hemisphere oriented such that they bridge said gap or space 600 thus effecting a substantially closed circuit between 510 and 520. Insulator 590 insulates said switch control lines from said address lines.

In another system address input line 510 is separated from address output line 520 by means of space 630 which contains magnetically poled and electrically conducting spheres 640. Application of a current to switch control line 620 effects the generation of a magnetic field as depicted causing said spheres to line up forming a conducting bridge between 510 and 520 as is known in the literature and thus effecting a substantially closed circuit between 510 and 520.

In another system address input line 510 has integral to it a conducting cantilever 515 separated from address output lines 520 by means of a gap. Application of a potential difference between line 510 and switch control line 650 causes an electrostatic attraction between said cantilever and said address output line thus effecting a substantially closed circuit between 510 and 520. Insulator 660 insulates said switch control line from said address output line.

In another system address input line 510 has integral to it a conducting cantilever which further has integral to it a magnetic substance 690. Said magnetically active conducting cantilever is separated from address output lines 520 by means of a gap. Application of a current to switch control loop 670 effects the generation of a magnetic field which causes said conducting cantilever to bend and make contact with said address output line thus effecting a substantially closed circuit between 510 and 520. Insulator 680 insulates said switch control line from said address output line.

Referring to FIGS. 14A-14E several schemes are known in the literature and the prior art for effecting an electronic switch or transistor function without moving parts. Referring to the upper figure address input line 510 is electrically isolated from address output line 520. Layers of scandium diphthalocyanine ($ScPc_2$) 740, nickel phthalocyanine (NiPc) 730, silicon dioxide ($SiO_2$) 720 and n-doped silicon (n-Si) bridge said address lines. By incorporating a control gate 700 a field-effect transistor in this case employing a dipthalocyanine thin film may be realized as is known in the literature. Such a structure may act as an address control line switch as said gate 700 may substantially control the flow of current from said address input line 510 to said address output line 520.

In another arrangement address input line 510 is isolated from address output line 520 by means of a stack including semi-conducting polymer layers 750 and a switch control line 760 consisting of a camphor sulfonic acid protonated polyaniline (PANI-CSA) grid electrode filled with a semi-conducting polymer. Such a structure may act as an address control line switch as such structure as just described forms a polymer grid triode (PGT) as is known in the literature such that said switch control line 760 may substantially control the flow of current from said address input line 510 to said address output line 520. Switch control line 760 may alternatively consist of a metal film in which case the described structure forms a current switch.

In another scheme a bipolar spin switch is formed by means of paramagnetic metal film 850 and ferromagnetic films 870 and 880. A bias applied between nonmagnetic metal electrode 860 and ferromagnetic film 870 serves to regulate the current between input electrode 510 and output electrode 520 thus forming a switch as is known in the existing literature.

In another scheme a hall effect switch may be effected whereby a potential may be formed across a hall effect material 910 between input electrode 510 and output electrode 520 by means of applying simultaneously an incident current injected by means of electrode 890 and collected by means of electrode 900 and a magnetic field H, perpendicular to said current, created by means of application of current to loop control line 670 and insulated by insulator 680.

In another scheme, curved resistor 930 which is electrically but not thermally insulated by means of insulator 940 may be caused to be heated by means of application of a current to said resistor causing the impedance in thermistive material 920, which possesses a negative temperature coefficient of resistance, to drop thus lowering the impedance between input electrode 510 and output electrode 520.

Some of the above described devices such as those formed of conducting polymers have considerable utility in the present application as they posses the property of structural flexibility, tunable electronic properties and simplified deposition procedures (such as spin casting) which may be suitable for certain substrates such as real paper or paper like substrates. It is understood however that standard inorganic semiconductor technology such a Si or GaAs may be employed especially if suitable substrates such as ultra thin glass were employed for part or all of the page display.

Referring to FIGS. 14F-14I in addition to standard semiconductor technology which involves deposition and subsequent etching it may be useful, especially on atypical substrates, to deposit a semiconductor ink from which transistors and switches may be fabricated. As described in the patent application Ser. No. 60/022,222, a semiconductor ink 943 may be fabricated by dispersing a semiconductor powder 945 in a suitable binder 946. Said semiconductive powder may be Si, germanium or GaAs or other suitable semiconductor and may further be doped, prior to being made into a powder, with n-type impurities such as phosphorus, antimony or arsenic or p-type impurities such as boron, gallium, indium or aluminum or other suitable n or p type dopants as is known in the art of semiconductor fabrication. Said binder 946 may be a vinyl, plastic heat curable or UV curable material or other suitable binder as is known in the art of conducting inks. Such an binder 946 when cured brings into proximity said semiconductive powder particles 945 to create a continuous percolated structure with semiconductive properties. Said semiconductive ink 943 may be applied by printing techniques to form switch or logic structures. As indicated in FIGS. 14F-14I an NPN junction transistor may be fabricated consisting of a n-type emitter 950, a p-type base 954 and a n-type collector 952.

Alternatively a field effect transistor may be printed such as a metal oxide semiconductor. Such a transistor consists of a p-type material metal oxide semiconductor. Such a transistor consists of a p-type material 970, an n-type material 966 an n-type inversion layer 968 an oxide layer 962 which acts as the gate, a source lead 960 and a drain lead 964.

Referring to FIGS. 15A-15D means are described for implementing control switches based on optical control or optoelectronic devices. Referring to the left uppermost figure electroluminescent material 780 is sandwiched between exciting electrodes 770 and 790 forming an electroluminescent light emitting structure which is electrically isolated by means of transparent isolator 795. Emitted light from said electroluminescent light emitting structure causes photoconductor 760 to undergo a decrease in impedance thus lowering the effective impedance between input electrode 510 and output electrode 520 as is known in the literature. Layer 800 is an opaque layer which serves to optically shield other components from said light emitting structure.

Alternatively a switch may be constructed where said electroluminescent light emitting structure is replaced by an optical fiber 802 which may be modified to scatter light to said photoconductor 760 and optical fiber light source 804 which may be a light emitting diode or laser diode or other suitable light source.

In another arrangement, said photoconductor may be replaced by a photodiode composed of an output electrode 510 with aperture 805, a heavily doped p+ layer 810, a depletion layer 820, a lightly doped n-type layer 830, an n+ layer 840 and an input electrode 520. Alternatively it is understood that any other photodiode or phototransistor structure as is known in the prior art may be employed.

Figure 16A:
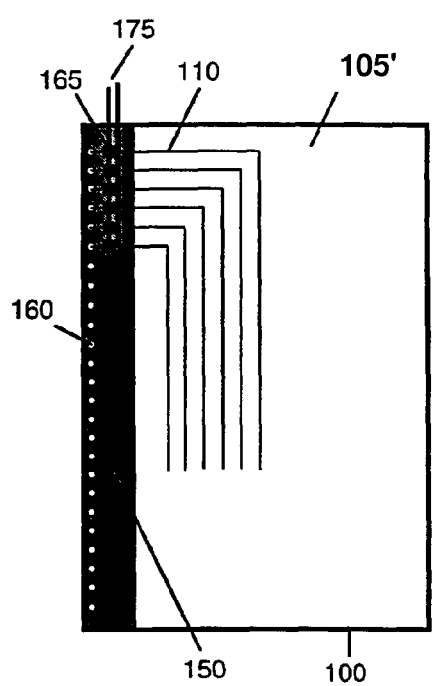
FIGS. 16A and 16B are partially perspective and partially schematic views of a single page of an electronic book and a means for binding a multiplicity of such pages.
Figure 16B:
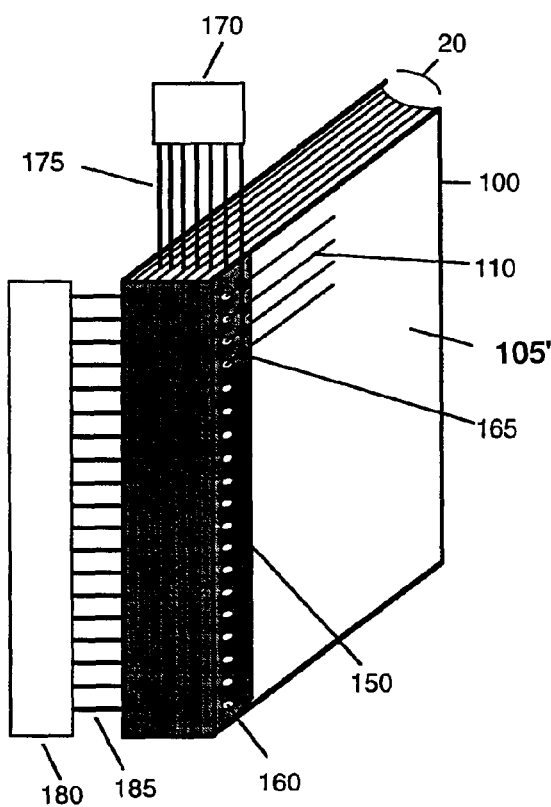

FIGS. 16A and 16B depict a preferred construction of a single electronically addressable page 100 and the means by which a multiplicity of said pages may be bound to form an ensemble of multiple page displays 20. Referring to the schematic of the single page, primary page substrate 105' may additionally encompass a second substrate part 150 which may be of a different material than said primary substrate such as a plastic or glass material with substantially different mechanical or electronic properties than the primary substrate material. Said second substrate material may have situated upon it page strobe or address logic 165 and page strobe or page address control lines 175. Said second substrate may further encompass apertures 160.

Referring to the perspective view of a multiplicity of pages such single page displays 100 may be combined to form a page display ensemble 20. Row or column address lines 110 may be connected to said apertures 160 such that display driver lines 185 may connect said address lines of each page 100 in said page ensemble thus forming common address lines from page to page. Such display driver lines may then further be connected to display driver 180. Such display driver lines which are common to each display page and which further connect through said apertures of said display pages may further serve to mechanically bind said pages to form said page display ensemble. Page strobe or page address lines 175 which are not common to each page may be connected to page strobe or page address driver 170.

Alternatively said substrate 105' may be of a single material. In another configuration said apertures 160 may be obviated and said control lines may be extended to the page edge where they may be connected to said driver lines. In another configuration additional mechanical bindings may be employed to mechanically bind said pages. It is readily understood that additional or alternative techniques of mechanical binding as is known in the art of book manufacture and other means of electrical connection as is known in the art of electronics and display manufacture may be employed.

Figure 17:
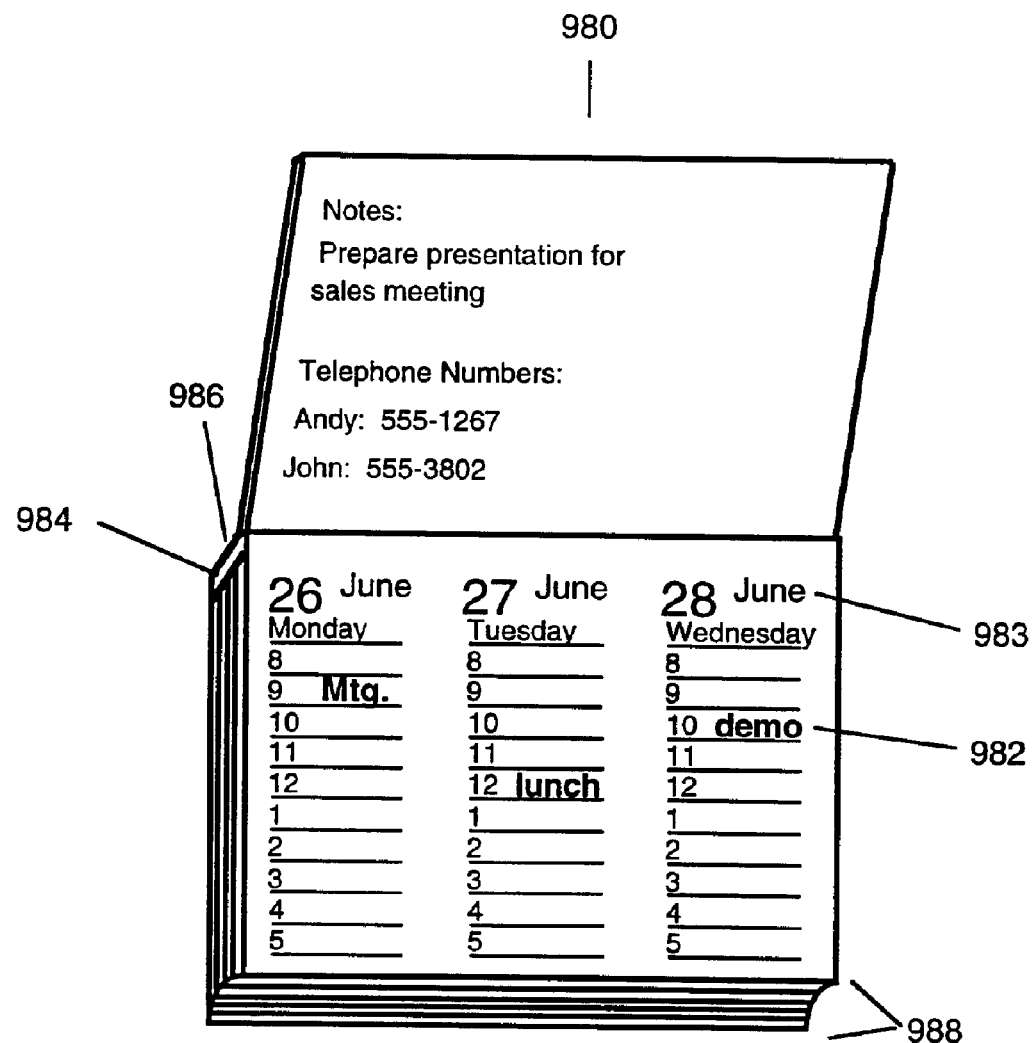
FIG. 17 is a schematic view of an electronic address/date book with multiple display pages.

Referring to FIG. 17 the materials and configurations of the previous description may be employed to construct an electronic address book/date book 980 with multiple electronically addressable display pages, 988; said book may have driver electronics 986 and an interface 984 to another computer of computer network. Said interface 984 may be wired or wireless or optical. Finally said address book/date book may bear permanently printed information 983 as well as changeable information 982.

Preferred embodiments of the invention using photo-addressing will now be described. As already indicated, one approach to three-dimensional addressing substitutes light valves for transistors or similar logic elements in at least one of the "dimensions" of the addressing. The light valve may be used in association with elongate light sources. Light may be emitted from all the elongate light sources which are wired in parallel, but the light valve layer is introduced between the light sources and the photoconductor layer, so that this light valve layer governs whether the light reaches the photoconductor. The embodiments of the invention shown in FIGS. 18-22 are all of this type.

Figure 18:
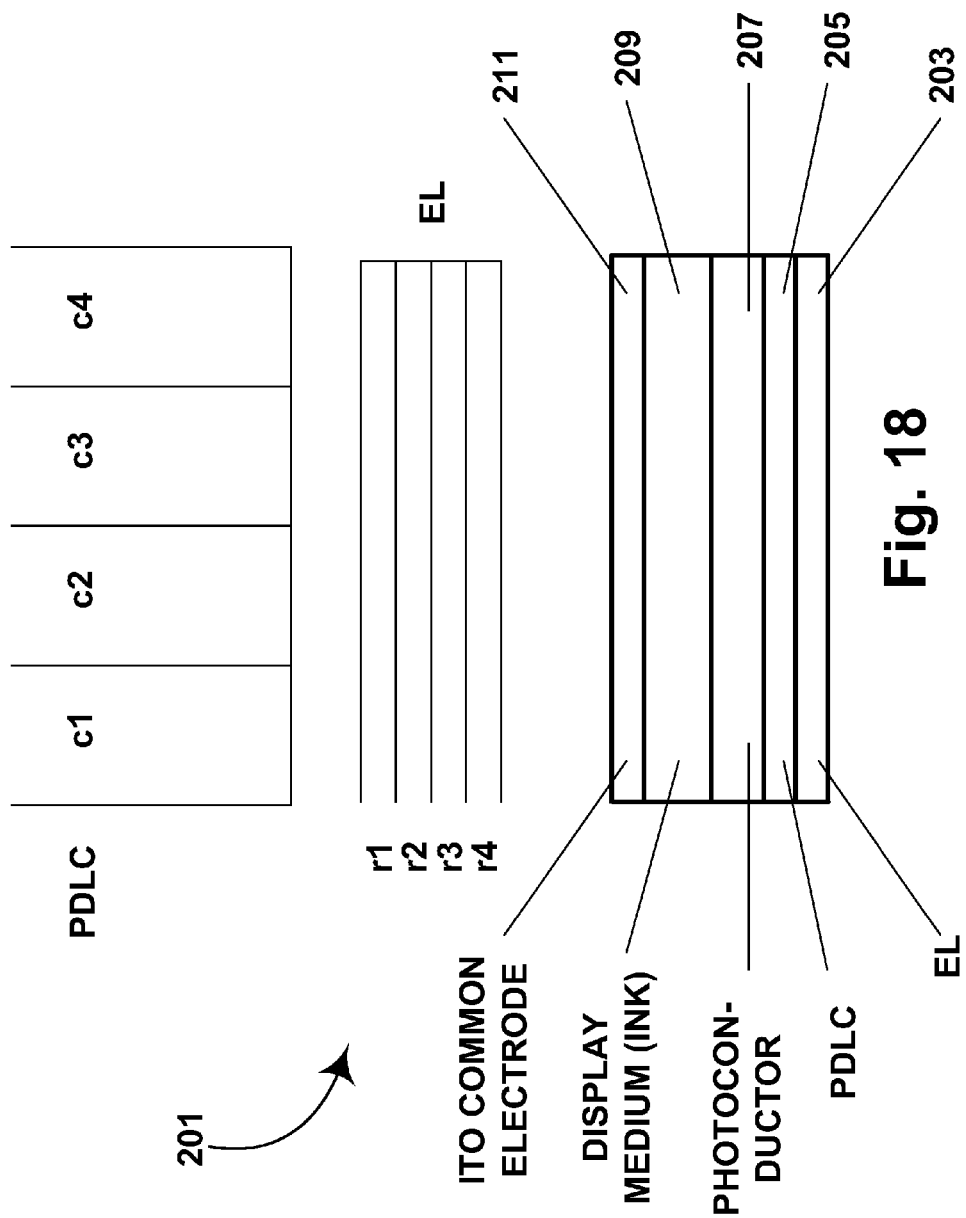

FIG. 18 shows one page (generally designated 201) of a display of the present invention, this page comprising, in order, an electroluminescent (EL) layer 203, a polymer-dispersed liquid crystal (PDLC) light valve layer 205, a photoconductor layer 207, an electrophoretic medium layer 209 and an indium-tin oxide (ITO) layer 211; the layer 211 is normally provided on a substrate (not shown). As indicated schematically in FIG. 18, the electroluminescent layer 203 is patterned into a plurality of elongate rows r1, r2, r3, r4 and the light valve layer 205 is patterned into a plurality of columns c1, c2, c3, c4 extending perpendicular to the rows. The columns c1, c2, c3, c4 are addressed directly and there is no need to pattern the top ITO layer into columns, although of course in a multi-page display the third dimension of addressing would be provided by transistor or similar devices to ensure that the ITO layer on only one page was selected at any given moment. A two-dimensional passive display is formed by the EL and PDLC columns, that emits light. The light may be emitted row-by-row, requiring k*y (where k and y are as previously defined) seconds to update y rows. Alternatively, if the PDLC and EL materials respond quickly relative to the photoconductor, the PDLC/EL display may be multiplexed and a complete graphical image produced that affects the photoconductor across the entire display, requiring only k seconds to update y rows.

Figure 19:
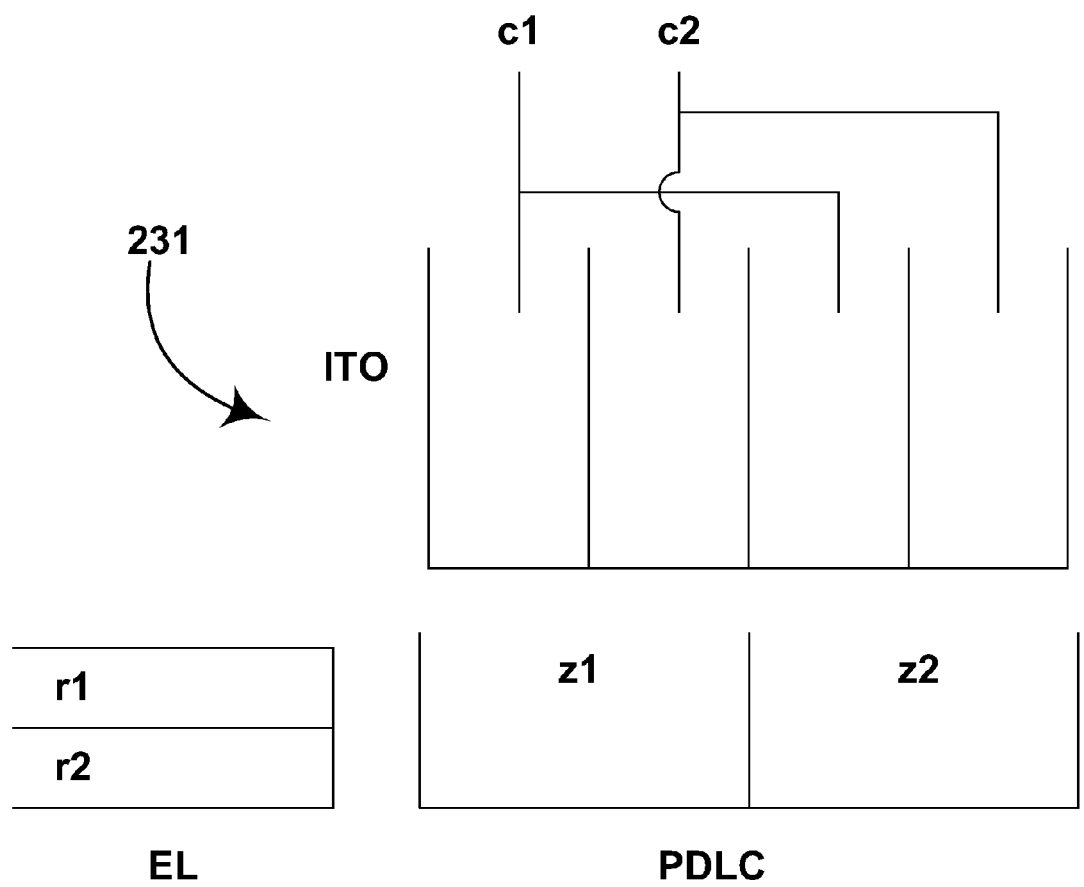

FIG. 19 shows a display (generally designated 231) which is generally similar to the display 201 shown in FIG. 18, in that the electroluminescent layer is again patterned into a plurality of elongate rows r1, r2. However in the display 231, the ITO layer is patterned to form alternating columns c1, c2 (the patterned columns correspond to groups of standard column-patterned electrode-over-ink columns), while the PDLC layer is patterned into columns which occupy the width of an adjacent pair of the columns in the ITO layer. This allows high resolution which permitting the groups of alternate ITO columns to be driven in parallel, as indicated in FIG. 19.

Figure 20:
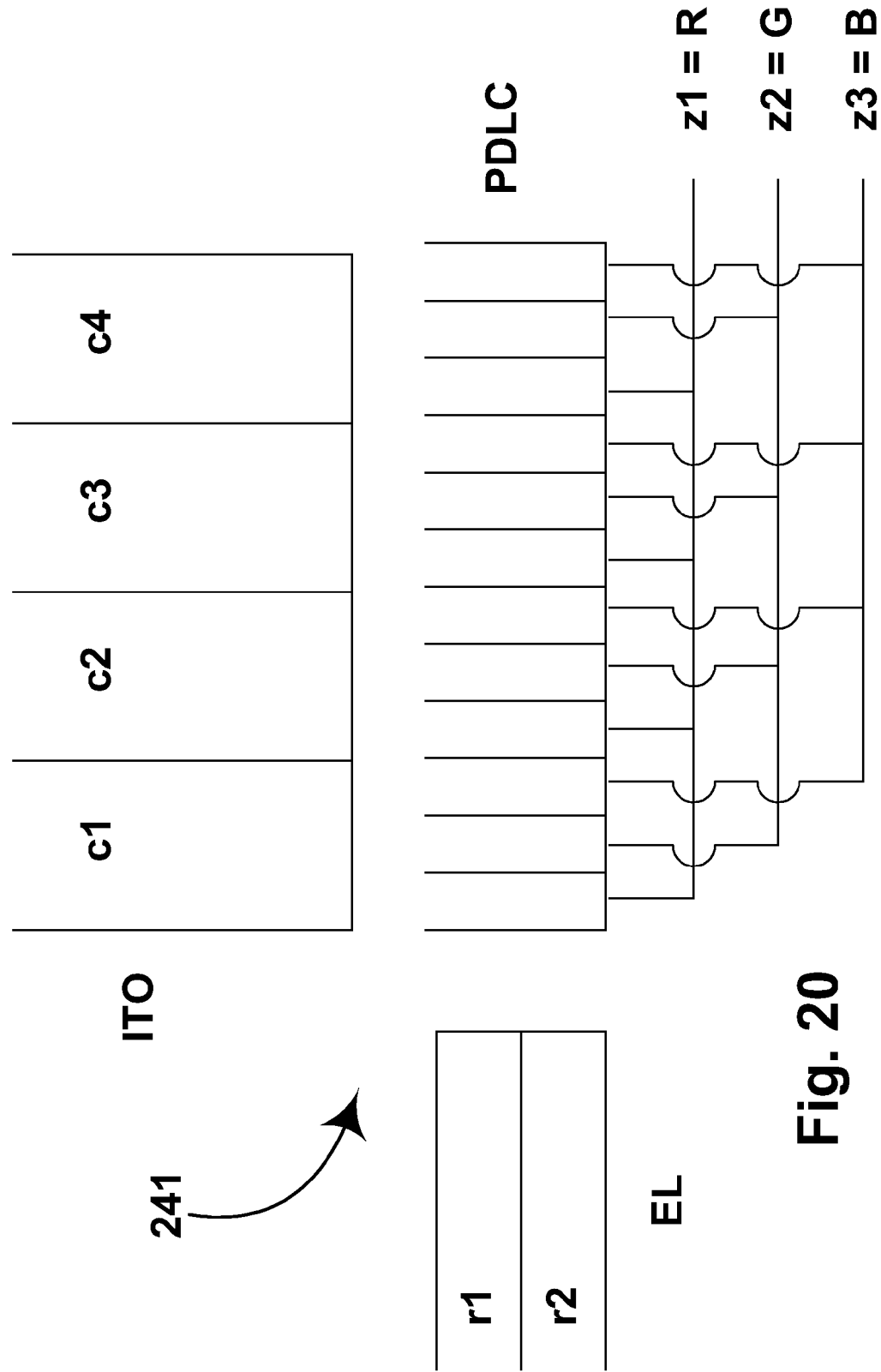

FIG. 20 shows a full color display (generally designated 241) in which the electroluminescent layer is again patterned into a plurality of elongate rows r1, r2. The ITO layer is again patterned to form columns c1, c2, c3, c4, but in this case each of these columns is individually selectable. The PDLC layer is patterned to form sub-columns one-third the width of the columns c1, c2, c3, c4 (although some other sub-multiple could be used), the sub-columns being arranged, as shown in FIG. 20, in three cyclically-repeating groups, the sub-columns of each group being driven in parallel. The three groups of sub-columns are associated with red, green and blue sub-pixels, and thus permit interlaced updating of the three colors of the display, as well as three-dimensional addressing.

FIG. 21 shows a display (generally designated 251) in which the ITO layer is patterned to form individually-selectable columns c1, c2, c3, c4 in the same manner as in FIG. 20. However, in the display 251, the PDLC layer is patterned to form individually-selectable rows z1, z2, orthogonal to the ITO columns c1, c2, c3, c4, while the EL layer is patterned to form sub-rows parallel to, but one-half the width of, the PDLC rows. Alternate EL sub-rows are driven in parallel to achieve three-dimensional addressing.

Finally, FIG. 22 shows a display (generally designated 261) which is essentially the converse of that shown in FIG. 21. The ITO layer is patterned to form individually-selectable columns c1, c2, c3, c4 in the same manner as in FIGS. 20 and 21. Again both the PDLC layer and the EL layer are patterned to form rows orthogonal to the ITO columns c1, c2, c3, c4, but in this case the EL layer is patterned to form individually-selectable rows r1, r2, while the PDLC layer is patterned to form sub-rows z1, z2 parallel to, but one-half the width of, the EL rows. Alternate PDLC sub-rows are driven in parallel to achieve three-dimensional addressing. This embodiment allows the achievement of row resolutions which are higher than may readily be achieved by patterning the EL layer.

It will readily be seen by those skilled in display technology that the principles illustrated by the preferred embodiments described above may be employed to create many combinations and variations in addressing schemes. In displays using electroluminescent or similar light-emitting layers, it is preferred that the time for which the light-emitting layer must be active be minimized to extend the life of the light-emitting layers. In addition, consideration must be given to the ease of patterning the respective layers into rows, columns and regions, and to the flexibility characteristics of the respective layers.

For example, one embodiment consists of column-patterned electrode-over-ink columns (in an ITO or similar layer) connected in parallel across z regions, a PDLC layer patterned in rows connected in parallel across z regions, and a light-emitting EL layer patterned into z regions, such as single pixels the size of pages of a multi-page display.

In such a display, to image, for example, row 24 on page 17, the column drivers are set at the appropriate voltage potential for black or white at those pixels in this row (the relevant potentials are applied on all pages but do not create an image change except where the photoconductor has been activated by light), all rows except row 24 are set at the voltage potential causing the PDLC to turn opaque, row 24 is set to the voltage potential allowing the PDLC to be transmissive, and the page 17 EL layer is activated. Thus, to address the entire book this way, a given page of EL material is active for only $k*y$ seconds.

For reasons which will be apparent to those skilled in typography, for applications such as imaging text in the Roman alphabet in a multi-page electronic book, it is desirable that the resolution be such that the number of columns (x) is greater than the number of rows (y); furthermore, the number of rows will typically be much greater than the number of pages (z). Hence, in a preferred embodiment, the PDLC layer is patterned into z regions, such as individual pages, while the EL layer is patterned into y rows. This corresponds to a variation of the embodiment of FIG. 19 in which z1 and z2 are separate pages. One advantage of this embodiment is that to address the entire book, a given row of EL material is active for only k seconds while each page is addressed for $k*z$ seconds, which is less than $k*y$ seconds. Furthermore, this embodiment requires that the highest resolution be used to pattern the ITO layer, which can readily be patterned at very high resolution. Also, pages are typically flexed from side to side but not top to bottom. In this embodiment, the relatively brittle ITO lines oriented in columns receive less physical stress than the relatively flexible EL lines oriented in rows. Indeed, stiff physical columns in or attached in connection with the display substrate could be used to heighten this protection without undue reduction in the utility of the display.

In further embodiments of the invention, the photoconductive layer could itself be patterned. In addition, the embodiments described above can readily be adapted to provide a four-dimensional (WXYZ) addressing scheme if all four addressing layers (the EL, PDLC, photoconductor and ITO layers) are patterned or if the display is split into separate physical pages, as in the display shown in FIG. 4. For example, the embodiment of FIG. 7, shown as covering a single page, could be replicated across multiple pages, with an additional set of addressing means provided to select the page to be written at any given moment.

Until now, it has been assumed that the light-emitting layers used in the preferred embodiments described above do not have a threshold for light emission. Consideration will now be given to the somewhat simpler case in which the light-emitting layer has a threshold, such that light emits only above a voltage potential V.

It will readily be seen that the addressing methods suitable for a non-threshold light-emitting layer (and combinations and variations thereof) may also be used with a threshold light-emitting layer. The threshold characteristic however provides an additional degree of freedom and enables three-dimensional addressing to be accomplished with fewer physical layers (or conversely permits a four or more-dimensional addressing scheme if enough patterned layers are present).

Given a threshold light-emitting layer, an addressable sub-array (z region) may be formed as follows. The bottom electrode of the light-emitting layer is patterned for example in rows. The top clear electrode of the light-emitting layer is patterned into z regions (as above, these regions may be correspond to groups of columns, groups of rows, sub-columns, sub-rows or discrete pages, or variations and combinations thereof). As a voltage of V/2 is applied to a row in parallel across each of the z regions, a voltage of V/2 is applied to any z region that needs to be addressed. This establishes the V potential difference and light is emitted only for the row(s) in that region.

For example, suppose a line r1 addresses the 10th row bottom electrode of the light-emitting layer on all pages of an electronic multi-page book. A common top electrode of the light-emitting layer on the 14th page is activated with V/2. Only the 10th row of the 14th page is imaged.

In a further embodiment, the light-emitting layer is patterned into columns and rows, for example in the form of a passive-OLED display. Multiple pages are provided with rows and columns wired in parallel. Each page is covered by a light valve, permitting each page to be addressed individually.

Alternatively, the light valve is omitted and the photoconductor and column-patterned electrode-over-ink layers are addressed discretely for each page, again permitting each page to be addressed individually.

The principles described above are especially useful when applied to flexible bistable displays and permit a flexible book-like or newspaper-like device to be created in which the various portions of the device are imaged one at a time; the loss of power to an already-addressed region does not result in a loss of image. Driver costs are minimized by enabling more than two addressing dimensions. The techniques described herein are also useful for any photoconductively-addressed display. Nevertheless, it will be seen by one skilled in the art that the same principles may be applied to non-flexible displays. In addition, the same principles may be applied to non-bistable displays such as passively addressed LCD's to reduce driver costs if the refresh rate experienced by a given pixel is sufficiently fast.

Several of the addressing methods referenced above require that the display be addressed sequentially in a row-by-row manner. Thus the image update rate is limited by the switching speed of the electro-optic medium. Attention will now be directed to the second main aspect of the present invention, namely addressing algorithms that can speed the apparent update rate of a bistable display.

An array of island capacitors may be introduced in association with the addressing array. These capacitors can be associated with individual pixels or with cluster-level logic structures as described above. Through passive XY addressing, positive or negative charge is transmitted into the array of capacitors in a pattern matching the desired pixel image. The capacitor array may be formed by any suitable means, such as printing an electrode, a dielectric and a top electrode, either on to the ink layer or on to the photoconductor layer, or as a separate sheet that is interposed and laminated, or as part of a TFT or other logic array.

In another process, the control circuitry stores the state of the display in memory and identifies the frame-to-frame changes between each update of the display image. Only the changes are imaged, i.e., only the pixels which are changed between two adjacent frames are addressed. For small changes, such as caused by a blinking cursor or a moving mouse against a constant background, the result may be a very fast updating time.

In another process, control circuitry identifies rows that require identical column switching impulses. All such rows are activated at the same time, so that the column electrodes address all these rows simultaneously. Thus, a checkerboard graphic for any arbitrary number of rows may be imaged in at most k*2 seconds, where k is the switch time for the electro-optic medium.

In another process, the display is first set all white (or black), and then halfway between black and white. This may occur in k+k/2 seconds. As each row is thereafter addressed, the necessary addressing time for that row is at most k*0.5 seconds. The addressing time is therefore decreased to k+k/2+k*0.5 seconds. For displays with many rows, this cuts addressing time essentially in half. Note that by halfway between black and white is meant a state where the time to switch all black and the time to switch all white are equal. If the rise and fall times of the display are different this may not be at the 50% gray level.

Thus, with a relatively simple algorithm, switching times may be greatly reduced. There are many algorithms by which pre-processing could reduce overall addressing time for the display. It is helpful to introduce some definitions to describe these algorithms.

The current value of any pixel may be described on a scale of 0 to 1 where 0=black and 1=white. In a bistable display, these states persist until the row is re-imaged. Similarly, each pixel (x, y) may be described as having a starting state $s(x,y)$ and desired finishing state $f(x,y)$ with a difference of $d(x,y)$. Thus, the difference between the display's current and desired state may be described as a matrix array of values ranging from −1 (from white to black) to +1 (from black to white).

The row switch time vector may be defined as the maximum absolute value in each row times k seconds. The time required to address the display in a straightforward row by row fashion is the sum of the values of the row switch time vectors of the individual rows. Similarly, the row switch direction may be defined as a function of the highest value in the row (H) and the lowest value of the row (L). Assuming the display switches from white to black with speed A and from black to white with speed B, the direction vector may be calculated as:

$$(B*H+A*L)/(A+B).$$

Assuming symmetric switching times, this simplifies to the midpoint between the high and the low. In short, if the row is all white and needs to turn all black, its switch direction is 1. However if the row is black on odd columns and white on even columns, and these must each reverse, the high is 1, the low is 1, and the switch direction is 0. The switch direction represents the value for which, if all pixels in the entire row were changed by that value, the row switch time would be minimized.

For example, if a row starts at [0, 0.1, 0] and finishes at [1,0.9,1] the difference vector for that row is [1,0.8,1]. The row switch time is k*1=k seconds. The row direction is the midpoint (assuming symmetric switch times) between 1 and 0.8 or 0.9. If the row experienced a switch impulse increasing all pixels by 0.9, the row would be [0.9,1,0.9] and the new difference vector would be [0.1, −0.1, 0.1]. The new switch time would be 0.1*k seconds, and the new switch direction would be 0. If only one row were addressed in this way, the total elapsed time would be 0.9*k plus 0.1*k, or k seconds.

(Note that the switch direction is calculated based on the extreme high and low values ("the outliers"), since the switch time must be sufficient on each row for the very last pixel to finish switching. However, a more complex variation of this algorithm would involve calculation of the distribution of values across the row and determining whether it would be better to exclude some values in order to address the bulk of the row and then return to these excluded values at a later time.)

In one process of this invention, the vector describing the row switch direction for each row is calculated. All rows have switch directions ranging from −1 to 1. Next, the average value of all switch directions is calculated as P. All rows are activated and an impulse of P is applied. Next, all rows that started with a switch direction below P are identified. The average remaining switch direction of these rows is Q. These rows are activated and a switch impulse of Q is applied. Next, the rows that started with switch direction above P are identified. The average remaining switch direction of these rows is R. These rows are activated and a switch impulse of R is applied.

At this stage, all rows have switch directions ranging from −1+Q to 1−R. That is, the switch directions for all rows have come closer to 0 in just 3 cycles, taking less than k*3 seconds.

In a variation to this technique, the steps may cease after the impulse of P or the impulse of Q is applied. In another variation of the technique, each impulse P, Q and R is applied to all rows for which the net result of the impulse is to move the row's switch direction closer to zero.

These steps may be repeated for N iterations, where N is any arbitrary real number. The display is then imaged in a standard row by row fashion. In a further variant of the process, the iterations continue until Q and R are close to zero. It may readily seen that the above techniques may be combined where appropriate to achieve faster switching times in a single display.

In the technique above, groups of rows were treated, but not groups of columns. Groups of columns may be treated using the same principles and the effects of the treatment of groups of rows and columns combined for overall faster addressing. For example, the values P, Q, and R, as defined above for rows, may be calculated. The values P', Q', and R' are also calculated in a similar manner for column switch directions. The maximum (in absolute terms) is determined among Q, Q', R, and R'. If Q or R is the maximum, that switch impulse is applied to all columns across designated rows. If Q' or R' is the maximum, that switch impulse is applied to all rows across designated columns. This process may be repeated for N iterations.

In a variation of this process, if Q or R is the maximum for example, the switch impulse of Q is applied to all columns against the associated rows, and then the switch impulse of R is applied to all columns against its associated rows. All 4 values Q, Q', R, R' are then recalculated, and the process may be repeated for N iterations.

Either method desirably proceeds until Q, Q', R, and R' are all close to zero. It will readily be apparent that if addressing using three or more dimensions is employed in any of the ways described above, the technique described in the foregoing passage may be extended to one or more additional dimensions by calculating values Q" and R" as well.

The selection of a specific method for a given display design may be affected by numerous factors, including the ratio of rows and columns, the relative number of rows as compared to switching speed, and by the processor power available for pre-processing, among other factors.

In another general approach, orthogonal wave functions such as are used for active addressing of LCD's are employed, adjusting (if necessary) for the bistable/multi-stable memory effect of electrophoretic and similar displays by calculating the difference in position required. These functions have a further advantage in that they have been implemented in silicon and may be simpler to calculate than a more complex approach. A variation may further be employed that takes into account the additional dimension of Z addressing.

It will readily be apparent to those skilled in the display art that the techniques described could also be used more generally to address any kind of passive display with memory effect.

From the foregoing description, it will be seen that the displays and processes of the present invention permit the number of drivers needed in a display to be greatly reduced, and provide processes by which electronic, light-emitting and light valve apparatus can usefully be combined to address a display. The present invention also provides several processes which substantially reduce the switching time of bi- and multi-stable displays.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An electronic display comprising an electro-optic material having a plurality of pixels, and separate first, second and third sets of addressing means for addressing said pixels, each of said pixels being associated with one addressing means in each of said three sets, such that any specific pixel of the display can be addressed by application of signals within predetermined ranges to each of the three addressing means associated with said specific pixel, the pixels being arranged in a plurality of sub-arrays, each pixel within any specific sub-array being associated with one of the first and second sets of addressing means, the third set of addressing means having the form of a plurality of switching means, at least one of said switching means being associated with each of said sub-arrays, the switching means associated with each sub-array having an off state, in which signals on at least one of the first and second sets of addressing means are prevented from reaching the associated sub-array, and an on state, in which signals from both the first and second sets addressing means are permitted to reach and address the associated sub-array, and wherein each sub-array comprises a discrete page, the pages formed by the plurality of sub-arrays being stacked on top of each other so that the entire display forms a multi-page electronic book.

2. An electronic display according to claim 1 further comprising control means arranged to control the switching means so that only the switching means associated with one sub-array is in its on state at any given moment.

3. An electronic display according to claim 1 further comprising conductive vias extending between adjacent pages and connecting at least one of the first and second sets of addressing means on said adjacent pages.

4. An electronic display according to claim 1 wherein the first second and third sets of addressing means all have the form of electrical conductors and/or electronic devices.

5. An electronic display according to claim 1 wherein at least one of the sets of addressing means comprises a photoconductor.

6. An electronic display according to claim 5 further comprising a light source associated with the photoconductor and selectively operable to switch the photoconductor between a conductive and a non-conductive state.

7. An electronic display according to claim 5 further comprising a light source associated with the photoconductor and a light valve disposed between the light source and the photoconductor and arranged to control transmission of light from the light source to the photoconductor.

8. An electronic display according to claim 7 wherein the light valve comprises a polymer-dispersed liquid crystal.

9. An electronic display according to claim 7 wherein the light source comprises an electroluminescent material.

10. An electronic display according to claim 7 comprising a plurality of light sources arranged as a series of elongate rows, and a plurality of light valves arranged as series of elongate columns crossing said elongate rows, said light sources and light valves together defining a two-dimensional array of pixels in said photoconductor.

11. An electronic display according to claim 7 having the form of a plurality of pages stacked on top of one another to form a multi-page electronic display, and wherein each page has a single light source and a single light valve, so that the page or pages to be written at any given moment are selected by controlling the state of the light valves.

12. An electronic display according to claim 7 wherein the first addressing means comprises a plurality of electrical conductors and means for applying potentials selectively to said conductors, the second addressing means comprises a plurality of light emitting devices and means for generating light selectively from said light emitting devices, and said third addressing means comprises a plurality of light valves and means for selectively setting said light valves to their transmissive or non-transmissive states.

13. An electronic display according to claim 1 having three sets of pixels arranged to display different colors, and wherein the third set of addressing means is arranged to select one of said three sets of pixels to be addressed at any given moment.

14. An electronic display according to claim 1 further comprising a fourth set of addressing means for addressing said pixels, said fourth set being separate from said first, second and third sets of addressing means, each of said pixels of said display being associated with one addressing means in each of said four sets, such that any specific pixel of the display can be addressed by application of signals within predetermined ranges to each of the four addressing means associated with said specific pixel.

15. An electronic display according to claim 1 wherein the electro-optic material comprises an electrophoretic medium.

16. An electronic display according to claim 15 wherein said electrophoretic medium is an encapsulated electrophoretic medium.

17. An electronic display according to claim 1 wherein the electro-optic material comprises a rotating bichromal object material.

18. An electronic display according to claim 1 wherein the electro-optic material operates by principle of one of the following: rotating bichromal objects, electrochromics, or suspended particles.

19. A method of addressing an electronic display, the method comprising: providing an electro-optic material having a plurality of pixels; providing first, second and third sets of addressing means for addressing said pixels, each of said pixels being associated with one addressing means in each of said three sets, the pixels being arranged in a plurality of sub-arrays, each pixels within any specific sub-array being associated with one of the first and second sets of addressing means, the third set of addressing means having the form of a plurality of switching means, at least one of said switching means being associated with each of said sub-arrays, the switching means associated with each sub-array having an off state, in which signals on at least one of the first and second sets of addressing means are prevented from reaching the associated sub-array, and an on state, in which signals from both the first and second sets of addressing means are permitted to reach and address the associated sub-array, and wherein each sub-array comprises a discrete page, the pages formed by the plurality of sub-arrays being stacked on top of each other so that the entire display forms a multi-page electronic book; and applying predetermined signals to the three addressing means associated with a specific pixel, thereby addressing said pixel.

* * * * *